(12) United States Patent
Pilat, Jr. et al.

(10) Patent No.: US 7,140,727 B2
(45) Date of Patent: *Nov. 28, 2006

(54) EYEGLASS FRAME ASSEMBLY

(75) Inventors: James F. Pilat, Jr., New York, NY (US); Ira S. Lerner, New York, NY (US)

(73) Assignee: ISL Technologies, LLC, New York, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 10/846,357

(22) Filed: May 14, 2004

(65) Prior Publication Data

US 2005/0007546 A1  Jan. 13, 2005

Related U.S. Application Data

(63) Continuation-in-part of application No. 10/678,964, filed on Oct. 2, 2003, which is a continuation-in-part of application No. 10/610,862, filed on Jun. 30, 2003, which is a continuation-in-part of application No. 10/269,811, filed on Oct. 11, 2002, now Pat. No. 6,595,634.

(60) Provisional application No. 60/394,837, filed on Jul. 10, 2002.

(51) Int. Cl.
*G02C 1/00* (2006.01)

(52) U.S. Cl. .......................... 351/41; 351/92; 351/103

(58) Field of Classification Search ................ 351/92, 351/103, 41, 83, 86, 90, 104–109
See application file for complete search history.

(56) References Cited

U.S. PATENT DOCUMENTS

| 188,246 A | 3/1877 | Johnson |
|---|---|---|
| 1,358,200 A | 11/1920 | Hansen |
| 1,679,233 A | 7/1928 | Strauss |
| 1,907,749 A | 5/1933 | Dechau |
| 1,936,319 A | 11/1933 | Wingate |
| 2,065,122 A | 12/1936 | Diggins |
| 2,141,063 A | 12/1938 | Euler |
| 2,254,637 A | 9/1941 | Welsh |
| 2,492,072 A | 12/1949 | Tapner |
| D170,435 S | 9/1953 | Weissman |
| 2,737,847 A | 3/1956 | Tesauro |
| 2,770,168 A | 11/1956 | Tesauro |
| 3,498,701 A | 3/1970 | Miller |
| 3,531,118 A | 9/1970 | Mabie te al. |
| 3,531,188 A | 9/1970 | LeBlanc et al. |
| 3,531,190 A | 9/1970 | Leblanc et al. |
| 3,565,517 A | 2/1971 | Gitlin et al. |
| 3,582,192 A | 6/1971 | Gitlin |

(Continued)

FOREIGN PATENT DOCUMENTS

CH    572 222    1/1976

(Continued)

OTHER PUBLICATIONS

New Product Announcement Supportign Material Q & A Pentax Magnet Eyeglass Frame; Oct. 1995; Pentax Vision Co., Ltd & Hoya Corp.

(Continued)

*Primary Examiner*—Hung Xuan Dang
(74) *Attorney, Agent, or Firm*—Knobbe Martens Olson & Bear LLP

(57) ABSTRACT

An eyewear frame assembly comprises at least one lens that is substantially encircled by a flexible wire or cable. The wire can be constructed as a monofilament wire or a multifilament wire. Various closing members are shown, some of which feature magnetic members.

84 Claims, 21 Drawing Sheets

U.S. PATENT DOCUMENTS

| | | |
|---|---|---|
| D221,480 S | 8/1971 | Luc et al. |
| 3,838,914 A | 10/1974 | Fernandez |
| 4,021,892 A | 5/1977 | Piper |
| 4,070,103 A | 1/1978 | Meeker |
| 4,196,981 A | 4/1980 | Waldrop |
| 4,380,379 A | 4/1983 | Ahern et al. |
| 4,432,616 A | 2/1984 | Kurosaka |
| 4,466,713 A | 8/1984 | Tanaka |
| 4,523,819 A | 6/1985 | Dianitsch et al. |
| 4,547,909 A | 10/1985 | Bell |
| 4,685,782 A | 8/1987 | Lhospice |
| D291,808 S | 9/1987 | Meyerspeer |
| 4,822,158 A | 4/1989 | Porsche |
| 4,878,749 A | 11/1989 | McGee |
| D307,756 S | 5/1990 | Porsche |
| 4,958,923 A | 9/1990 | Rosenson |
| 4,958,924 A | 9/1990 | Parker |
| 4,973,148 A | 11/1990 | Gazeley |
| 4,988,181 A | 1/1991 | Riach, Jr. |
| 5,048,944 A | 9/1991 | Porsche |
| 5,162,824 A | 11/1992 | Klemka |
| 5,181,051 A | 1/1993 | Townsend et al. |
| 5,243,366 A | 9/1993 | Blevins |
| 5,321,442 A | 6/1994 | Albanese |
| 5,355,184 A | 10/1994 | Varveris et al. |
| 5,371,554 A | 12/1994 | Aspesi |
| 5,389,981 A | 2/1995 | Riach, Jr. |
| 5,410,763 A | 5/1995 | Bolle |
| 5,416,537 A | 5/1995 | Sadler |
| 5,423,712 A | 6/1995 | Underwood et al. |
| 5,428,407 A | 6/1995 | Sheffield |
| 5,431,595 A | 7/1995 | Underwood |
| D371,567 S | 7/1996 | Fukuchi |
| 5,568,207 A | 10/1996 | Chao |
| 5,592,243 A | 1/1997 | Chao |
| 5,642,177 A | 6/1997 | Nishioka |
| 5,654,785 A | 8/1997 | Shih et al. |
| 5,663,780 A | 9/1997 | Murai et al. |
| 5,684,558 A | 11/1997 | Hamamoto |
| 5,710,614 A | 1/1998 | Cereda |
| 5,724,118 A | 3/1998 | Krebs |
| 5,737,054 A | 4/1998 | Chao |
| 5,867,244 A | 2/1999 | Martin |
| 5,889,574 A | 3/1999 | Gandl-Schiller |
| 5,912,718 A | 6/1999 | Murai et al. |
| 5,914,768 A | 6/1999 | Hyoi |
| 6,027,214 A | 2/2000 | Graham |
| 6,089,706 A * | 7/2000 | Pilat, Jr. .................. 351/47 |
| 6,099,119 A | 8/2000 | Kim |
| 6,109,747 A | 8/2000 | Chao |
| 6,139,142 A | 10/2000 | Zelman |
| 6,149,269 A | 11/2000 | Madison |
| 6,264,325 B1 | 7/2001 | Peressini et al. |
| 6,264,326 B1 | 7/2001 | Hyoi |
| 6,343,858 B1 | 2/2002 | Zelman |
| 6,588,897 B1 | 7/2003 | Nadler et al. |
| 6,595,634 B1 * | 7/2003 | Pilat, Jr. .................. 351/41 |
| 2005/0007546 A1 | 1/2005 | Pilat et al. |

FOREIGN PATENT DOCUMENTS

| | | |
|---|---|---|
| CN | 1117593 | 2/1996 |
| DE | 17 97 366 | 1/1971 |
| DE | 85 07 761 U1 | 5/1985 |
| DE | 34 13 827 A1 | 8/1985 |
| DE | 88 06 898 U1 | 10/1988 |
| DE | 39 05 041 A1 | 8/1990 |
| DE | 39 19 489 A1 | 12/1990 |
| DE | 39 20 879 A1 | 1/1991 |
| DE | 39 21 987 A1 | 1/1991 |
| DE | 39 33 310 A1 | 1/1991 |
| DE | 92 16 919 U1 | 4/1993 |
| DE | 43 16 698 A1 | 11/1994 |
| DE | 295 18 590 | 11/1995 |
| DE | 295 16 670 U1 | 5/1996 |
| EP | 0 502 796 B1 | 2/1992 |
| EP | 0 469 699 A1 | 5/1992 |
| EP | 0 743 545 A1 | 11/1996 |
| EP | 0 955 560 | 11/1999 |
| FR | 915421 | 11/1946 |
| FR | 1037755 | 9/1953 |
| FR | 1061253 | 4/1954 |
| FR | 1266652 | 6/1961 |
| FR | 2 483 632 | 4/1981 |
| FR | 2 657 436 A1 | 7/1991 |
| GB | 812880 | 5/1959 |
| GB | 846425 | 8/1960 |
| GB | 855268 | 11/1960 |
| JP | 56-072983 | 5/1956 |
| JP | 44-15392 | 7/1969 |
| JP | 54-111841 | 9/1979 |
| JP | 54-111842 | 9/1979 |
| JP | 54-163052 | 12/1979 |
| JP | 55-50217 | 4/1980 |
| JP | 55-083022 | 6/1980 |
| JP | 55-133014 | 10/1980 |
| JP | 55-135814 | 10/1980 |
| JP | 56-29209 | 3/1981 |
| JP | 56-095214 | 8/1981 |
| JP | 56-153317 | 11/1981 |
| JP | 57-178215 | 11/1982 |
| JP | 57-184910 | 11/1982 |
| JP | 60-146217 | 8/1985 |
| JP | 61-2621 | 1/1986 |
| JP | 63-188626 | 12/1988 |
| JP | 1-136114 | 5/1989 |
| JP | 5/157997 | 6/1993 |
| JP | 05-196899 | 8/1993 |
| JP | 5-40493 | 10/1993 |
| JP | 05-289029 | 11/1993 |
| JP | 06-265828 | 9/1994 |
| JP | 06-331943 | 12/1994 |
| JP | 07-028001 | 1/1995 |
| JP | 7-10722 | 2/1995 |
| JP | 07-056123 | 3/1995 |
| JP | 7-128620 | 5/1995 |
| JP | 07-244259 | 9/1995 |
| JP | 08-050263 | 2/1996 |
| JP | 274588 | 4/1996 |
| JP | 09-043544 | 2/1997 |
| JP | 09-061754 | 3/1997 |
| JP | 9-101489 | 4/1997 |
| JP | 7-156856 | 8/1997 |
| JP | 2000-122001 | 4/2000 |
| JP | 2001-166266 | 6/2001 |
| JP | 2002-031783 | 1/2002 |
| RU | 220885 | 9/1968 |
| WO | WO 90/09611 | 8/1990 |
| WO | WO 95/18986 | 7/1995 |
| WO | WO 95/23995 | 8/1995 |
| WO | WO 99/42890 | 8/1999 |
| WO | WO 03/040809 | 5/2003 |
| WO | WO 03/040809 A2 | 5/2003 |

OTHER PUBLICATIONS

Aspen Booth #1570 Ad.; Aspex—memoflex®, EASYCLIP™.
Rex-Oval Frame Drawing; Jan. 5, 1994; SUNREEVE.
Takumi-Oval Frame and Lens Designs Brochure; Sunreeve Co., Ltd.: "Takumi-Oval" series.
Publication of Pat. No. 5,389,981; Feb. 14, 1995; Eyeglasses Having Magnets Attached Thereto For Improving The Blood Circulation of the Eyes.

Pentax Vision Co., Ltd.; Oct. 3, 1995; Pentax Magnet Eyeglass Frames.

Twin Come Catalog Advertisement; Nov. 1995; They Change From Glasses to Sunglasses with One Touch; 5 pages.

Translation of DE 88 06 898; Oct. 27, 1988; Magnetic Spectacle Frame and Magnetic Attachment Lens Piece.

Japanese Patent Office Patent Journal; Kokai Utility Model No. SHO 61[1986]-2621; Jan. 9, 1986; Glasses Having Lenses Capable of Insertion and Removal.

Color photos of eyewear; 4 photos.

Baltimore Business Publications, Inc. 1995; Jul. 28, 1995; Copyright 1995; vol. 13; No. 10; Sec. 1; p. 2; Magnetic sunglasses by Chameez Inc, of Baltimore; 1 page.

PR Newswire Association, Inc.; Copyright 1995; Jul. 27, 1995; Section: Financial News; Magnetic Sunglases, Chameez, Inc., Baltimore, MD; 2 pages.

International Glasses Design Competition '93 Japan, Issues on Oct. 5, 1993, pp. 22,30,32,33,36,40,49,50,70.

* cited by examiner

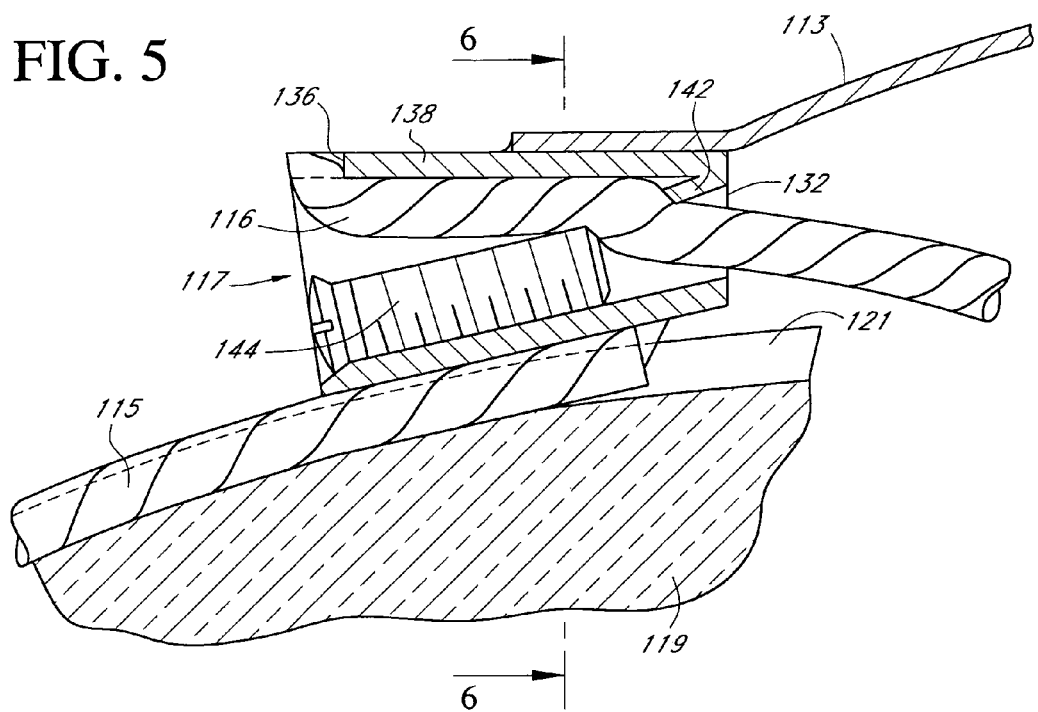
FIG. 5
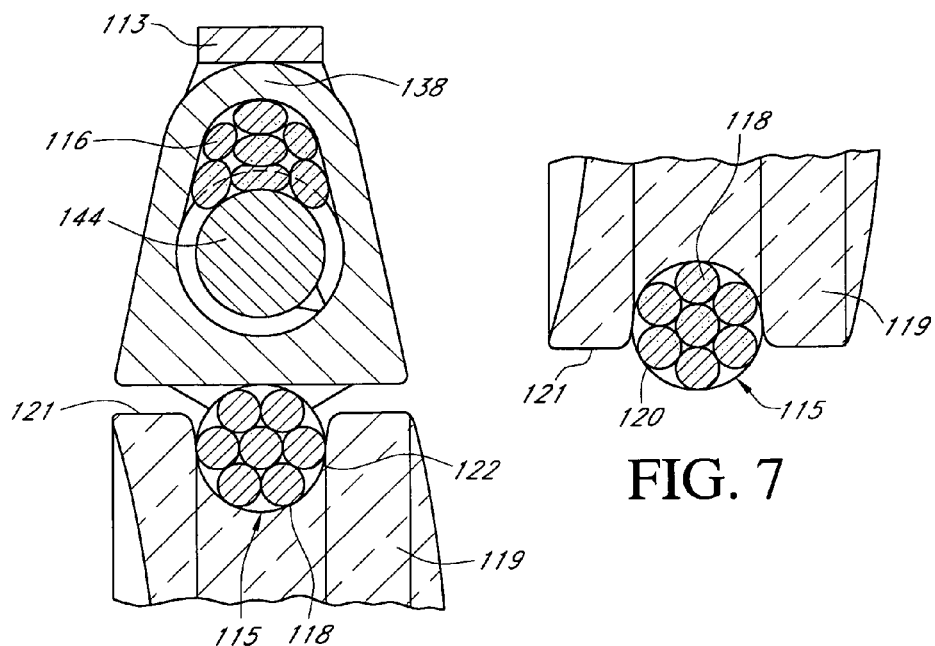
FIG. 6
FIG. 7

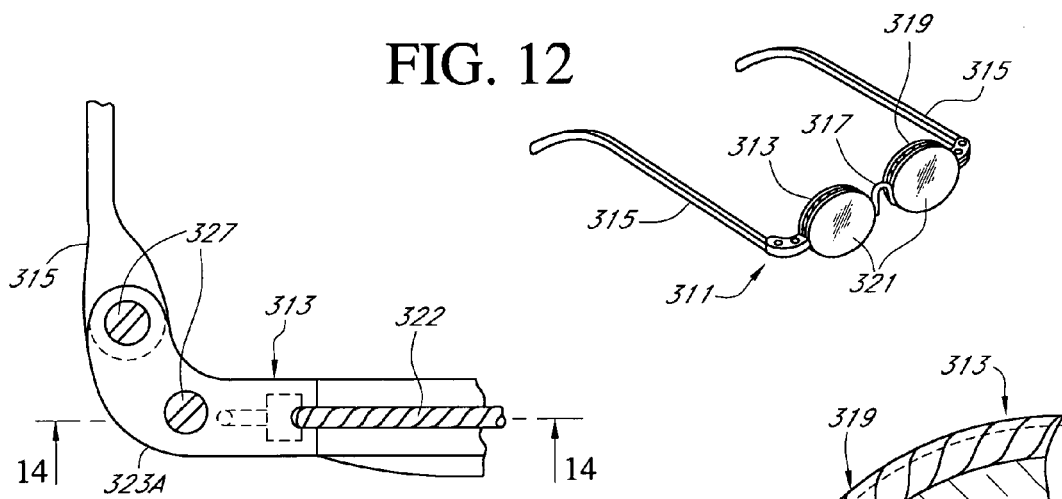
FIG. 12
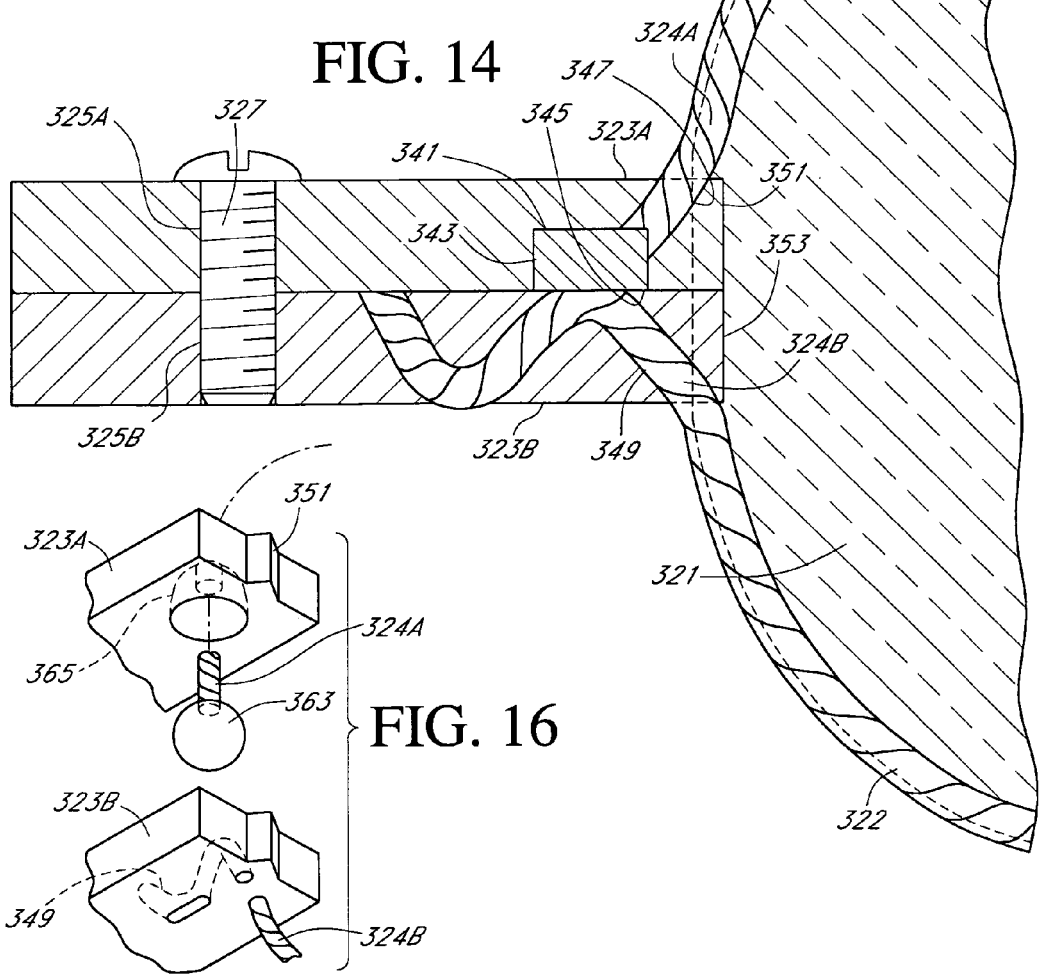
FIG. 13
FIG. 14
FIG. 16

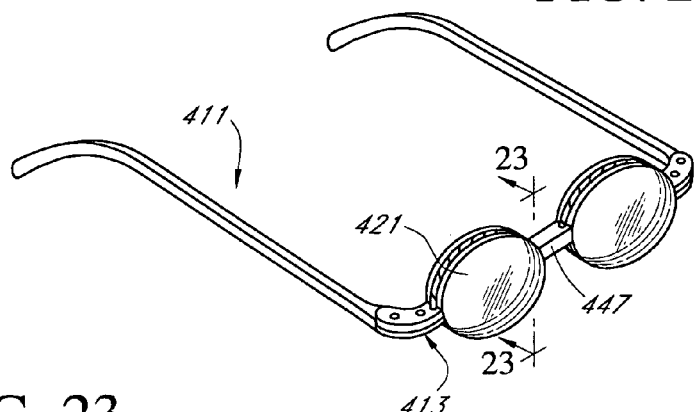
FIG. 22
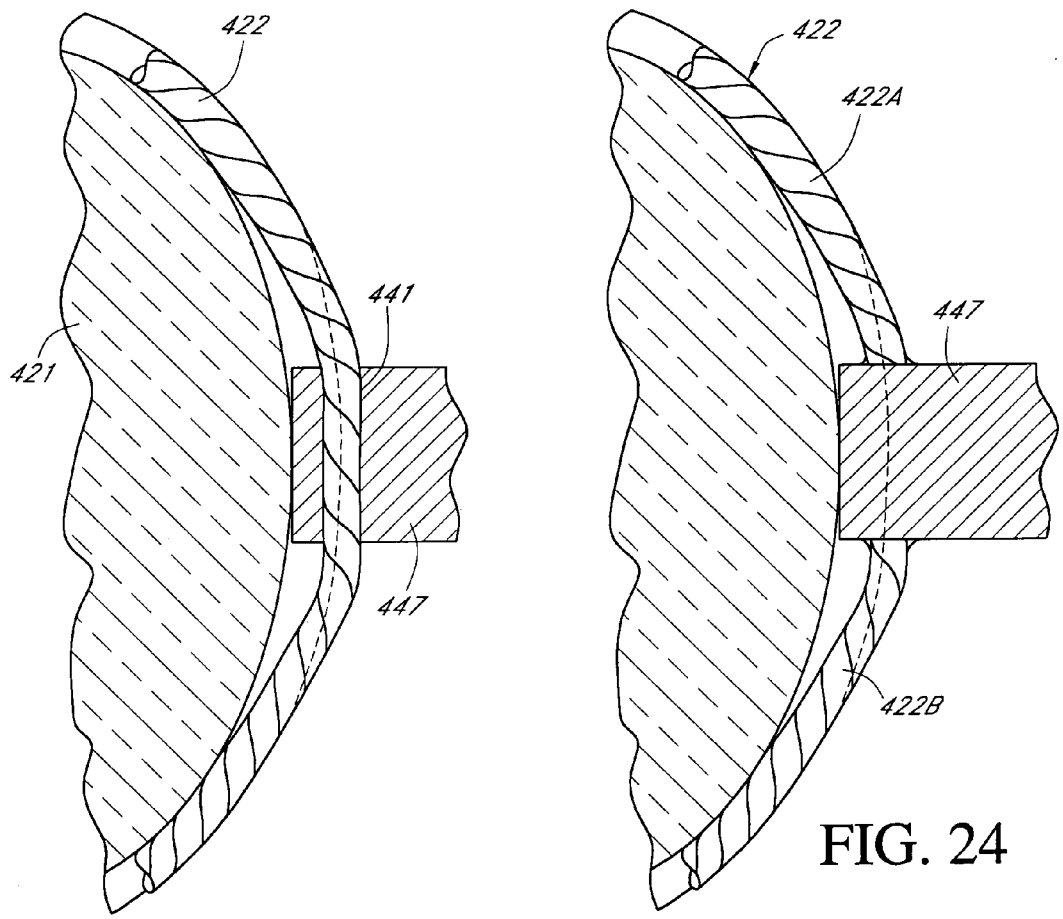
FIG. 23
FIG. 24

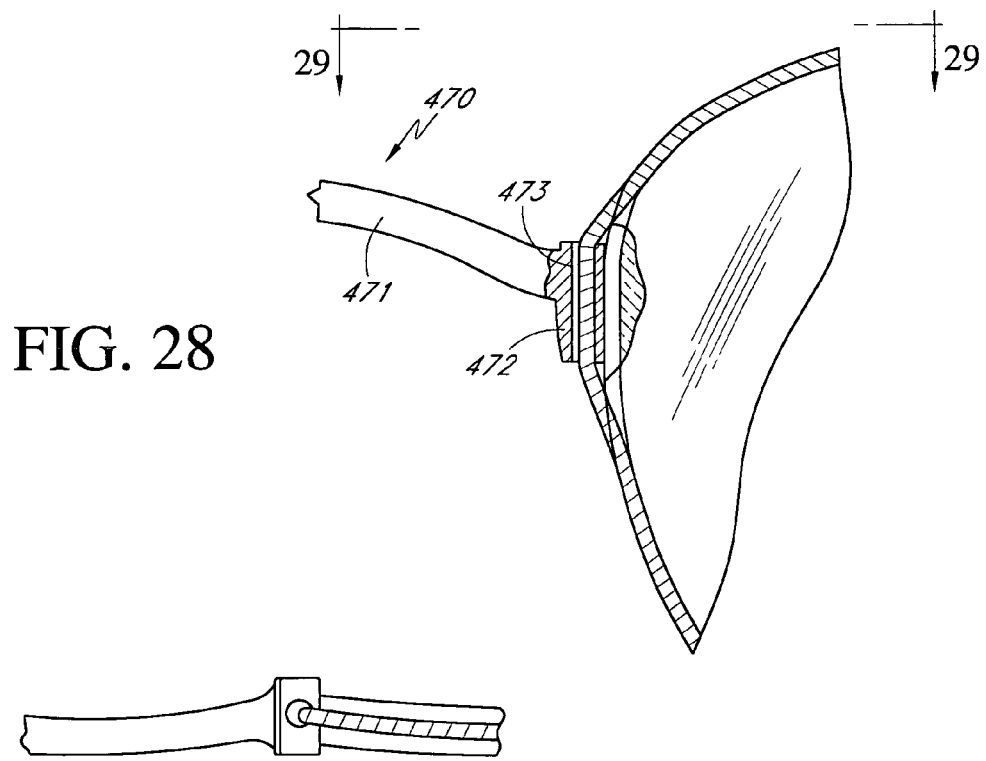
FIG. 28
FIG. 29
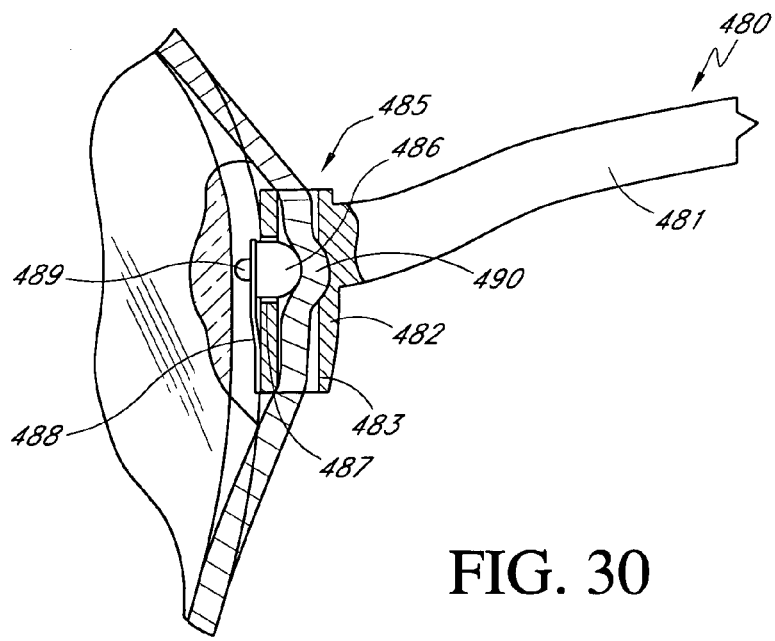
FIG. 30

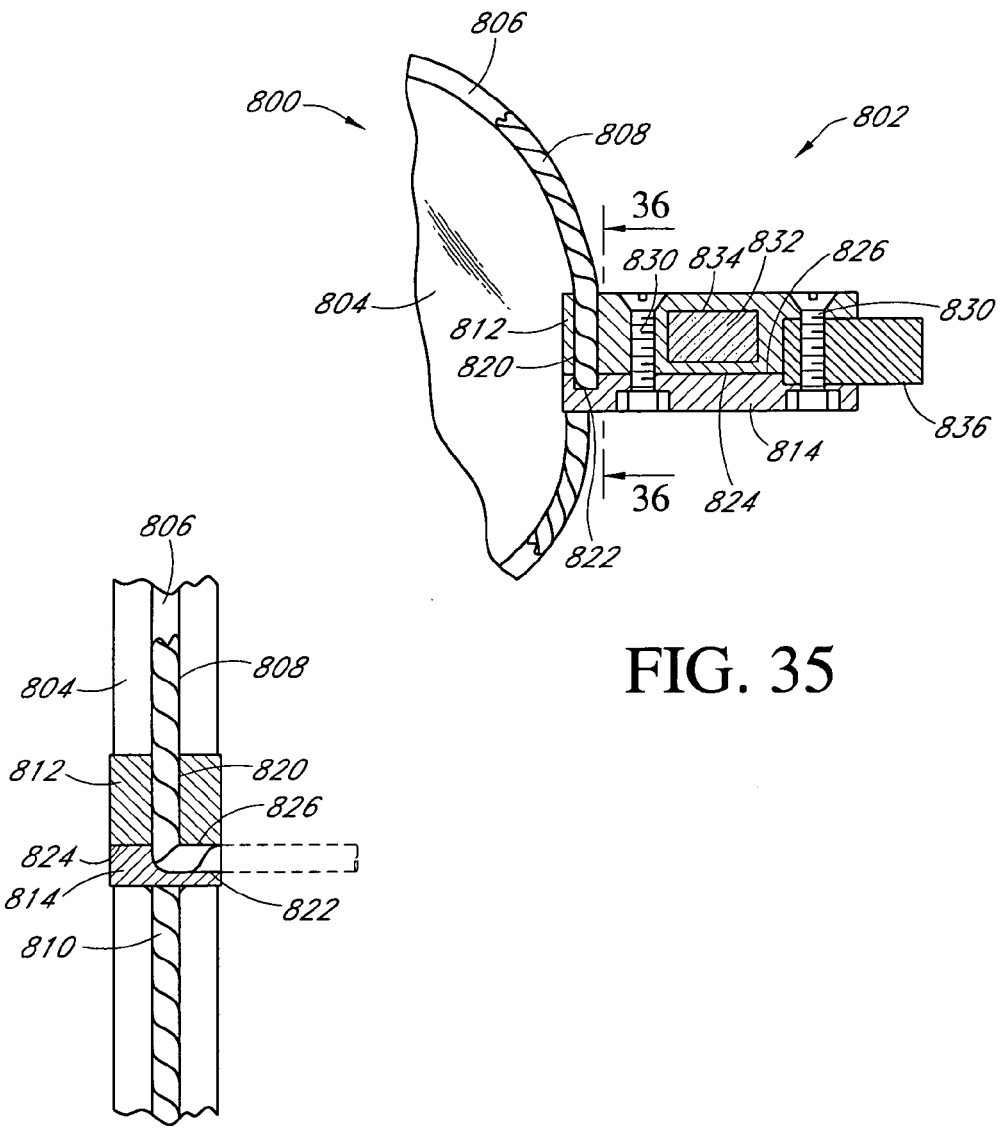
FIG. 35
FIG. 36
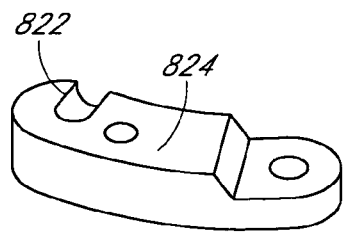
FIG. 37

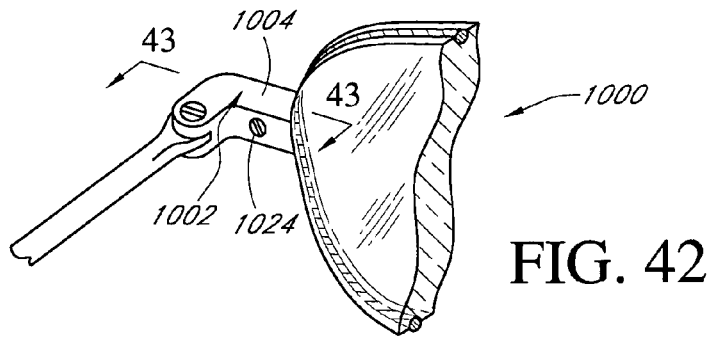
FIG. 42
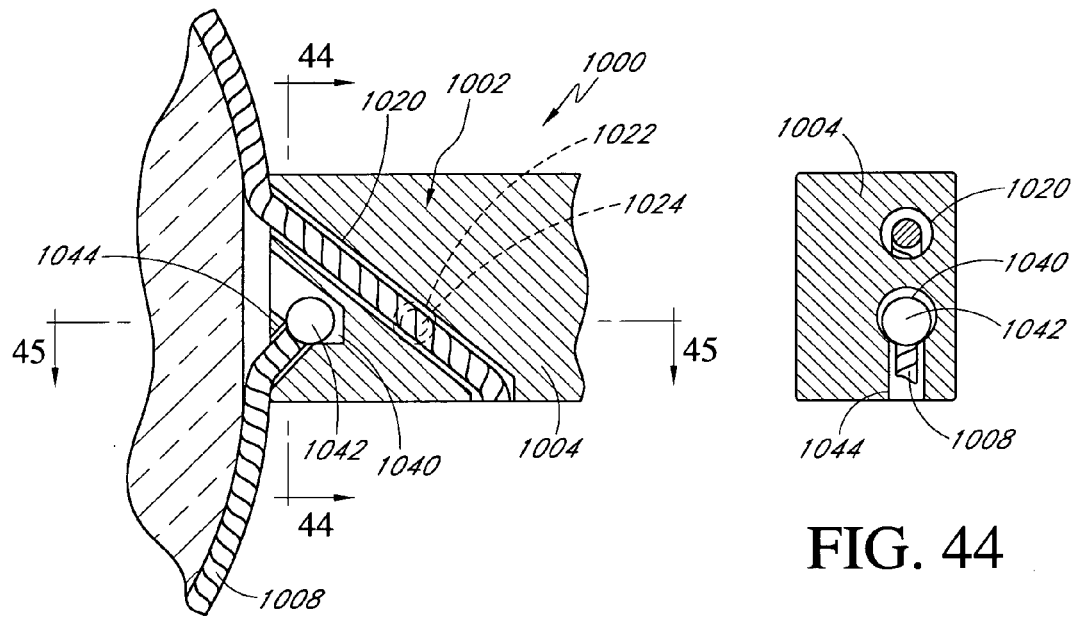
FIG. 43
FIG. 44
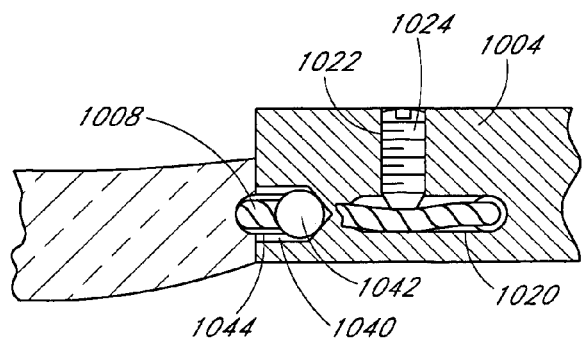
FIG. 45

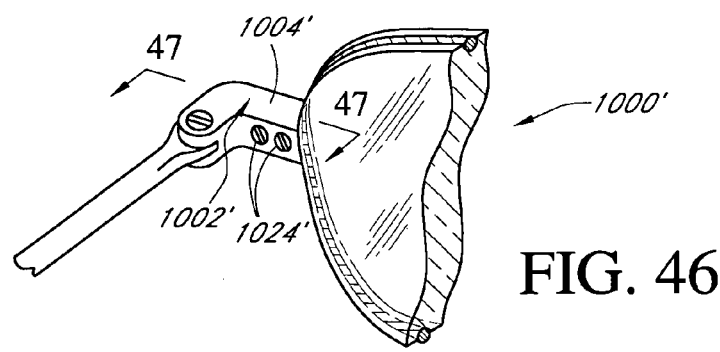
FIG. 46
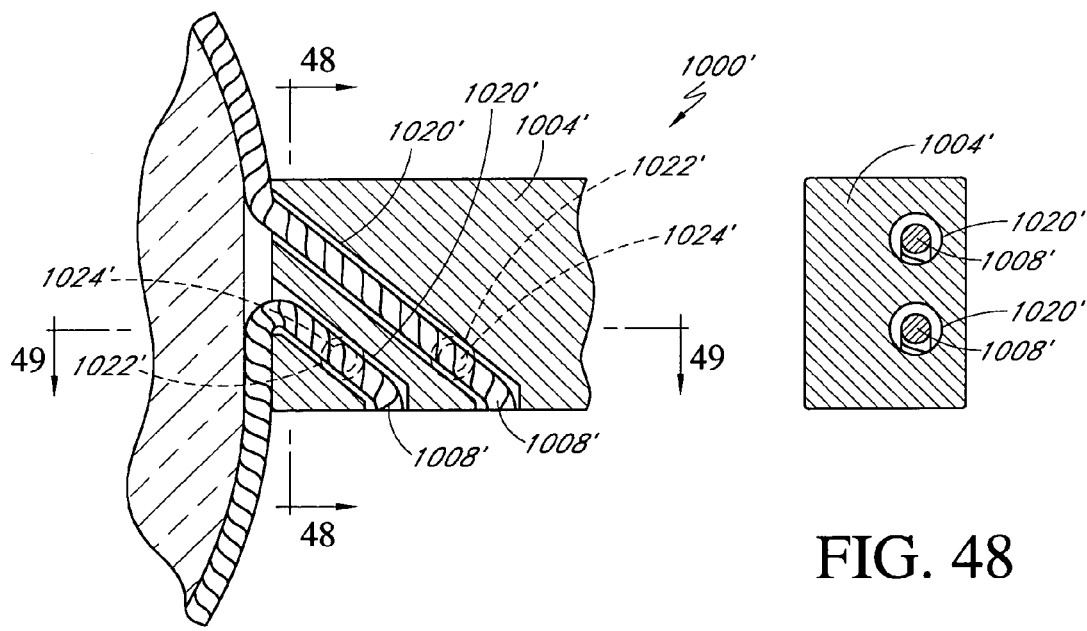
FIG. 47
FIG. 48
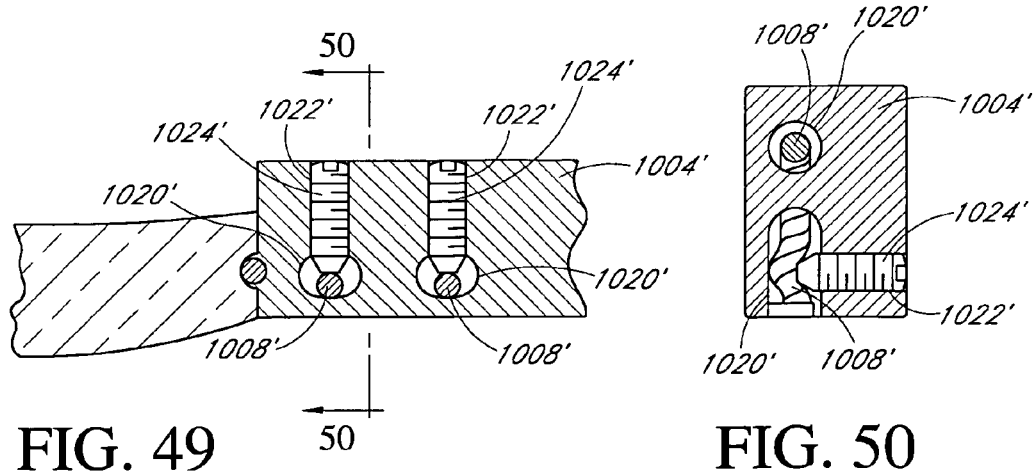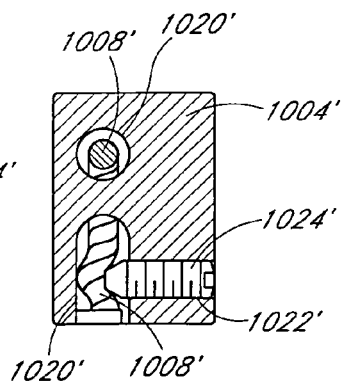
FIG. 49
FIG. 50

EYEGLASS FRAME ASSEMBLY

RELATED APPLICATIONS

This application is a continuation-in-part of U.S. patent application Ser. No. 10/678,964, filed on Oct. 2, 2003, which application is a continuation-in-part of U.S. patent application Ser. No. 10/610,862, filed on Jun. 30, 2003, which is a continuation-in-part of U.S. patent application Ser. No. 10/269,811, filed Oct. 11, 2002 and issued on Jul. 22, 2003 as U.S. Pat. No. 6,595,634, which claims the priority benefit of U.S. Provisional Application No. 60/394,837, filed Jul. 10, 2002. Each of these applications is incorporated herein by reference in its entirety. Copending U.S. patent application Ser. No. 10/846,953, filed concurrently herewith, entitled Adjustable Tensioning System for Rimless Eyewear, and copending U.S. patent application Ser. No. 10/846,349, filed concurrently herewith, entitled Adjustable Tensioning System for Rimless Eyewear also are hereby incorporated by reference in their entirety.

BACKGROUND OF THE INVENTION

1. Field of the Invention

The present invention relates to eyewear. More particularly, the present invention relates to a specially designed eyewear unit or assembly.

2. Description of the Related Art

Eyewear styles change frequently and fashionable eyewear can be costly to purchase. In the past, eyewear style has been defined by a frame formed at least partially of metal and/or resin based materials. As such, the eyewear was heavy and the style and size of the lenses were fixed based upon the frame. To accommodate the fashion whims and optical needs of the public, hundreds of eyewear styles with differing lens sizes and shapes must currently be manufactured. To manufacture a frame for each style typically requires a large manufacturing run of each size and shape. This is costly and can result in a cost that is not recovered if the eyewear style is not popular enough to sell sufficient quantities.

Recently, so-called rimless eyewear has been introduced in which temples and a bridge are directly secured to the lenses with threaded fasteners, posts or the like, which require holes to extend through the lenses. Such rimless eyewear has been quickly adopted within the fashion world. The rimless eyewear is very light due to the lack of a heavy frame around the lenses.

However, there are several disadvantages of the truly rimless eyewear. First, the holes used to secure a bridge and a pair of temples to the lenses must be drilled very precisely. Thus, most optical technicians are not able to perform the drilling in-house and outside lens preparation services must be used. Such outside services are costly and add additional time to the eyewear supply process such that end users need to wait longer for the eyewear.

Further, drilling the necessary holes in the eyewear can lead to lens breakage, even by the outside services. The cost of replacement lenses obviously must be calculated into the end cost of the eyewear, which further increases the cost of eyewear.

Finally, the lens materials often may not have the sufficient strength for the long term use and abuse often attributed to some eyeglass wearers. Many persons in the eyewear industry, therefore, have been trying to find a better alternative to the rimless eyewear constructions currently found in the industry.

SUMMARY OF THE INVENTION

An eyewear assembly is desired that can create a rimless eyewear appearance without the difficulties associated with the supply and assembly of current rimless eyewear constructions. An eyewear assembly is also desired that can be fitted with lenses by most optical technicians without the necessity to use outside services. Furthermore, eyewear assemblies are desired in which an optician can easily accommodate the diverse desires of the public for various lens shapes and sizes while maintaining a low inventory of frames. Accordingly, an eyewear assembly is desired in which a single base frame can be used for lenses of varying shapes. In addition, an eyewear assembly is sometimes desired in which a single base frame can be used for lenses of varying sizes.

Accordingly, some embodiments of the present invention provide an eyewear system that comprises at least one eyewear lens having an end surface that defines a perimeter of the lens. A wire extends around the perimeter with the perimeter having a total length and the wire extending around at least about 90% of the total length.

According to some embodiments of the present invention, an eyeglass frame assembly is provided comprising a first lens and a second lens. A first wire substantially encircles the first lens and a second wire substantially encircles the second lens. A bridge connects the first wire and the second wire. The first wire has a first end and a second end and the second wire has a first end and a second end. A first closing member is connected to the first wire and the first closing member connects the first end of the first wire to the second end of the first wire. A second closing member is connected to the second wire and the second closing member connects the first end of the second wire to the second end of the second wire.

According to some embodiments of the present invention, an eyewear system is provided comprising at least one eyewear lens having an end surface that defines a perimeter of the lens. A wire extends around the perimeter. The perimeter has a total length and less than a total of at least about 10% of the total length of the perimeter is contacted by portions of rigid components.

In one arrangement, the eyewear can be assembled by an optician. The optician prepares the lenses with a groove extending about the periphery of each lens. A wire is wrapped around the lens. The wire is formed in a loop with a closing mechanism and the other components (e.g., bridge and temples) are secured to the lenses directly or indirectly with the wire. For example, the wire that secures the closing mechanism against the lens, may be used to attach the temples.

According to some embodiments of the present invention, an eyewear system is provided comprising at least one eyewear lens having an end surface that defines a perimeter of the lens. The wire extends around the perimeter. The perimeter has a total length and less than a total of at least about 10%, and more preferably 5%, of the total length of the perimeter is contacted by portions of rigid components.

Since there are many well-known methods of attaching temples to a projection extending from the outside perimeter edge of a lens, it should be understood in reading any descriptions of the embodiments of the present invention that any suitable method can be used to attach the temples to the various closing mechanisms described herein.

BRIEF DESCRIPTION OF THE DRAWINGS

These and other features, aspects and advantages of the present invention will now be described with reference to the drawings of several preferred embodiments. The illustrated embodiments are intended to illustrate and not to limit the invention. The drawings comprise the following figures.

FIG. 5 is an enlarged sectioned view of a portion of the frame assembly of FIG. 1 taken along line 5—5 of FIG. 4.

FIG. 6 is a sectioned view of the frame assembly of FIG. 1 taken along line 6—6 of FIG. 5.

FIG. 7 is a sectioned view of the frame assembly of FIG. 1 taken along line 7—7 of FIG. 4.

FIG. 12 is a perspective view of another embodiment of a frame assembly having certain features, aspects and advantages of the present invention.

FIG. 13 is a top plan view of a portion of the frame assembly of FIG. 12.

FIG. 14 is a sectioned view of the portion of the frame assembly shown in FIG. 13 taken along line 14—14 of FIG. 13.

FIG. 16 is an exploded perspective view of a portion of another embodiment of a frame assembly having certain features, aspects and advantages of the present invention.

FIG. 22 is a perspective view of a further embodiment of a frame assembly having certain features, aspects and advantages of the present invention.

FIG. 23 is a sectioned view of the embodiment of FIG. 22 taken along line 23—23 of FIG. 22.

FIG. 24 is a sectioned view of another frame assembly having certain features, aspects and advantages of the present invention.

FIG. 28 is an illustration of a further bridge construction for eyewear arranged and configured in accordance with some embodiments of the present invention.

FIG. 29 is a view along line 29—29 of the bridge construction shown in FIG. 28.

FIG. 30 is a sectioned view of a bridge construction for eyewear arranged and configured in accordance with some embodiments of the present invention.

FIG. 35 is a sectioned view of another embodiment of a frame assembly having certain features, aspects and advantages of the present invention and comprising a lens holding structure closing mechanism that incorporates a magnetic member.

FIG. 36 is a sectioned view of the embodiment of FIG. 35 taken along the line 36—36 in FIG. 35.

FIG. 37 is a perspective view of a lower closing member of the embodiment of FIG. 35.

FIG. 42 is a partial perspective view of a further embodiment of a frame assembly having certain features, aspects and advantages of the present invention.

FIG. 43 is a sectioned view of the embodiment of FIG. 42 taken along the line 43—43 in FIG. 42.

FIG. 44 is a sectioned view of the embodiment of FIG. 42 taken along the line 44—44 in FIG. 43.

FIG. 45 is a sectioned view of the embodiment of FIG. 42 taken along the line 45—45 in FIG. 43.

FIG. 46 is a partial perspective view of another embodiment of a frame assembly having certain features, aspects and advantages of the present invention.

FIG. 47 is a sectioned view of the embodiment of FIG. 46 taken along the line 47—47 in FIG. 46.

FIG. 48 is a sectioned view of the embodiment of FIG. 46 taken along the line 48—48 in FIG. 47.

FIG. 49 is a sectioned view of the embodiment of FIG. 46 taken along the line 49—49 in FIG. 47.

FIG. 50 is a sectioned view of the embodiment of FIG. 46 taken along the line 50—50 in FIG. 49.

DETAILED DESCRIPTION OF THE PREFERRED EMBODIMENT

The present invention generally relates to eyewear frame assemblies. In at least one embodiment of the present invention, the eyewear frame assembly features a flexible wire that forms at least a major portion of a lens securing frame. In some arrangements, the flexible wire generally circumscribes the associated lens. To provide a generic frame assembly that is capable of providing customizable lens shapes and sizes, the wire can have a length sufficient to extend around a lens and can be tightened about the lens such that lenses of varied sizes and shapes can be secured within a single frame assembly. When the lenses have been secured, the excess wire may be removed in any suitable manner, including but not limited to wire cutters or the like. This configuration provides an almost limitless selection of eyewear lens styles while requiring only a single frame assembly that can receive and secure the lenses. In all of the embodiments described herein, the lenses can comprise a tinted lens, a corrective lens or any other desired type of lens, including but not limited to a protective lens.

Preferably, the wire extends around at least about 90% of the circumference of the associated lens. In some embodiments, the wire extends around at least about 95% of the circumference of the associated lens. In other embodiments, the wire extends almost entirely or entirely around the circumference of the associated lens. By extending the wire around substantially the entire circumference of the associated lens within a groove, a rimless look is provided to eyewear while creating a flexible and durable lens mounting system as compared to other rimless or semi-rimless eyewear (e.g., eyewear with the lens secured in an upper or lower metal frame with a nylon cord). In addition, such a construction is easy to assemble by opticians and the like without the use of costly and time consuming outside services often employed to assemble other types of fully rimless eyewear.

Furthermore, in some embodiments, rigid components, such as, for example but without limitation, a bridge, a brow bar, or closing members are positioned along the circumference of the associated lens. Preferably, these rigid components together span less than about 10% of the total circumferential length of the lens. In some embodiments, the rigid components span less than about 5% of the total circumferential length. In some preferred embodiments, the closing members have a vertical dimension that is smaller than at least one of a lateral dimension and a rearward (i.e., toward the ear) dimension. Such embodiments reduce the aesthetic presence of the closing members and improve the rimless appearance of the eyewear.

Figure 1:
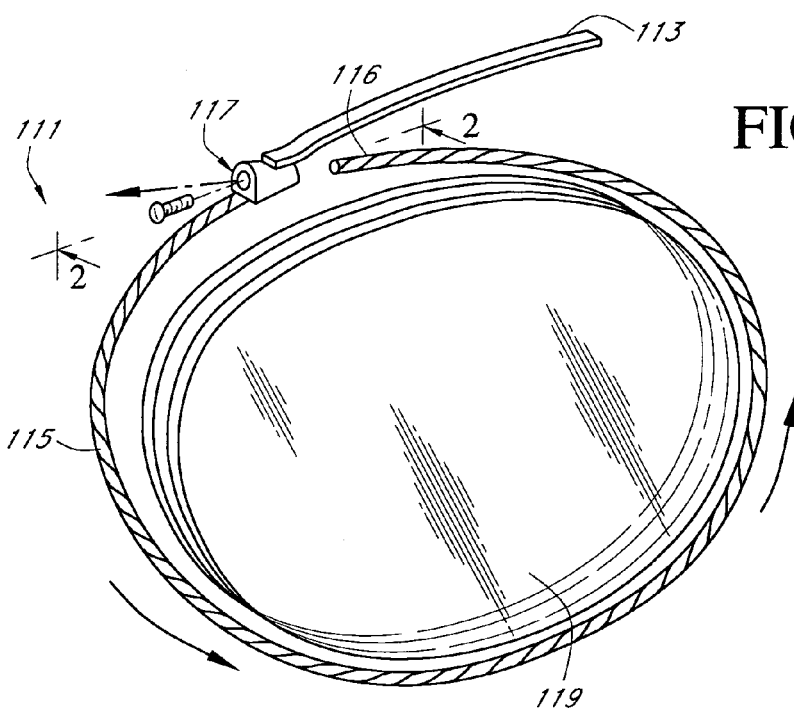
FIG. 1 is a partial perspective view of an embodiment of a frame assembly having certain features, aspects and advantages of the present invention.
Figure 2:
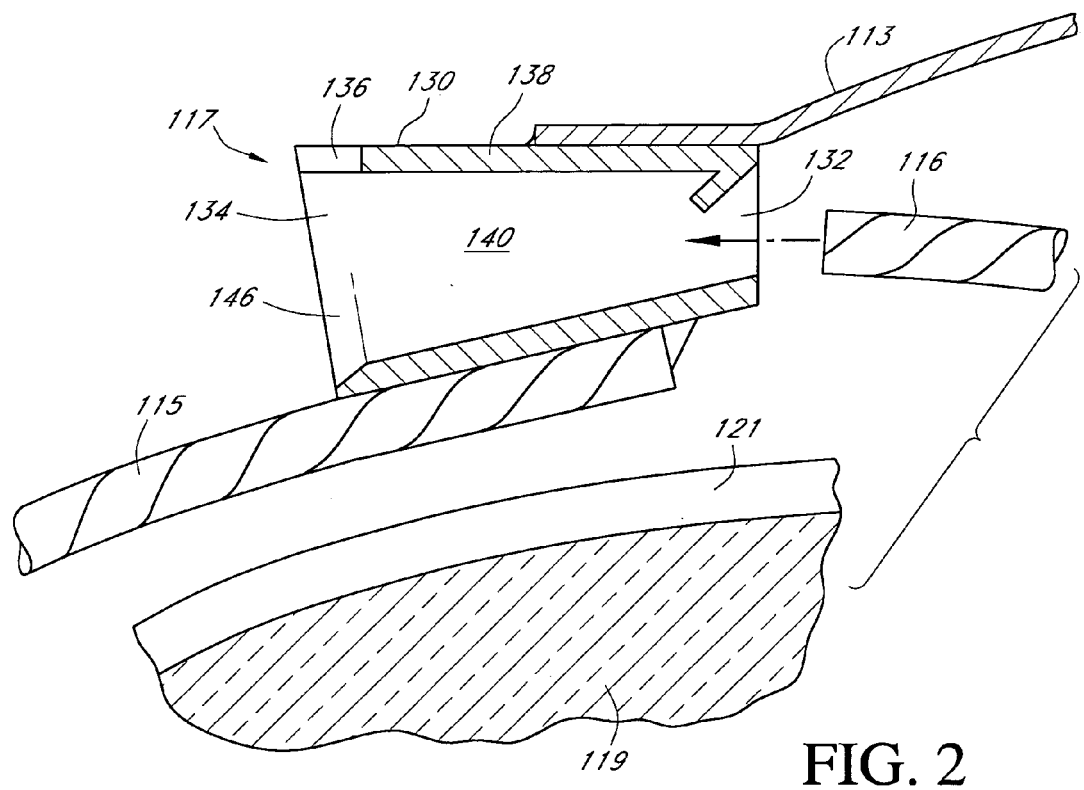
FIG. 2 is an enlarged sectioned view of a portion of the frame assembly of FIG. 1 taken along line 2—2 of FIG. 1.
Figure 8:
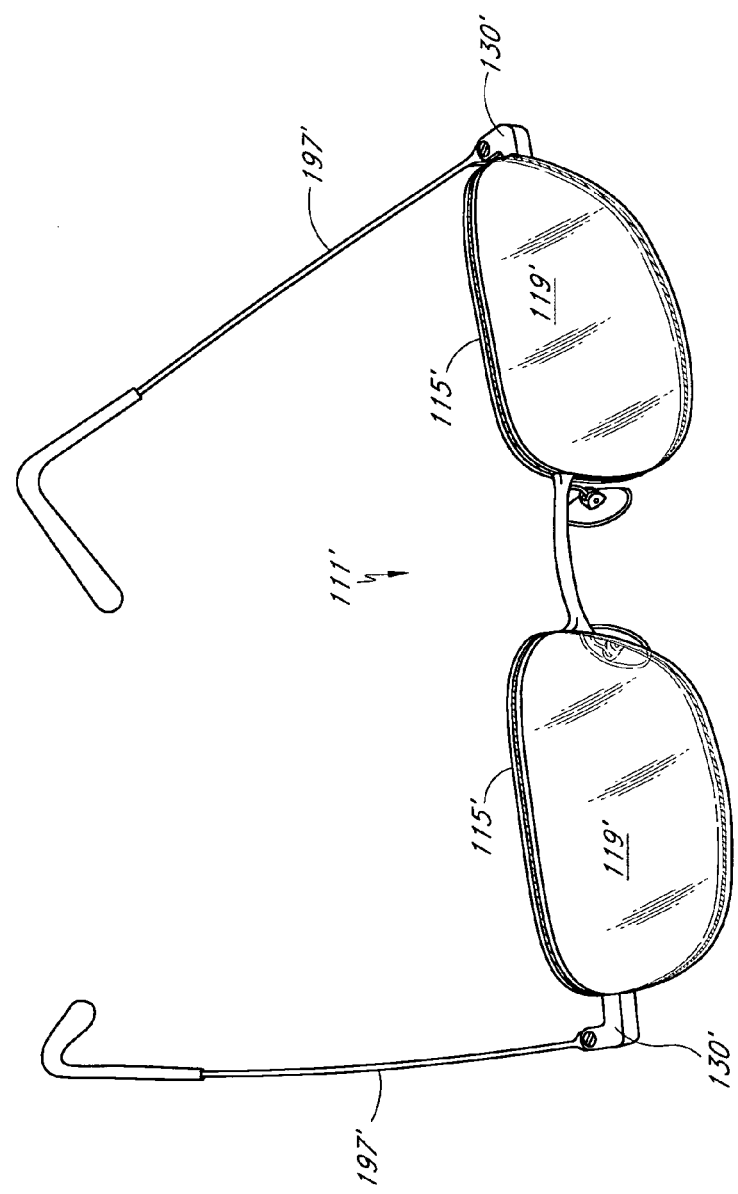
FIG. 8 is a perspective view of a frame assembly embodying the arrangement of FIG. 1 and comprising a bridge member and a pair of temple members.

With reference now to FIG. 1 and FIG. 2, an embodiment of eyewear comprising a frame assembly 111 that is arranged and configured in accordance with certain features, aspects and advantages of the present invention is shown. The frame assembly 111 generally comprises a brow bar 113 and a pair of wires 115. While not shown in FIG. 1 and FIG. 2, the frame assembly preferably comprises a pair of temples (not shown), which can be configured in any manner described below or any other suitable manner. In some embodiments, a bridge or nosepiece (not shown) can be provided in addition to, or as an alternative to, the brow bar 113. For instance, an arrangement is shown in FIG. 8 where the brow bar has been eliminated and the eyewear comprises a bridge and a pair of temples.

The wires 115 preferably are substantially flexible and extend from each end of the illustrated brow bar 113. In the illustrated arrangement, the wires 115 are connected to the brow bar 113 by an intervening structure. In particular, the wires 115 are secured to a portion of a locking unit 117, which is secured to the brow bar 113. More particularly, in the illustrated arrangement, one end of the wire 115 is secured to an exterior surface of the locking unit 117. In other arrangements, the wire 115 can be secured to an interior surface of the locking unit 117 at both ends. In yet other arrangements, the locking unit 117 can be integrally formed with the wire 115, the brow bar 113 or both. In some further arrangements, some of which are described below, the locking unit 117 can be integrated into components that secure temples to the lenses.

The brow bar 113 preferably is formed of a suitable material. In one arrangement, the brow bar 113 is formed of a metal, a metal alloy or a metal composite composition. In some arrangements, the brow bar 113 can be formed from resin-based materials or the like. Moreover, the brow bar 113 in the illustrated arrangement has a slightly arcuate shape but the brow bar 113 can have other configurations, including but not limited to, relatively linear constructions or more serpentine shapes. The illustrated brow bar 113 also is formed of a thin, flat, bar-like piece of material. In other arrangements, the brow bar 113 can have other cross-sectional configurations and can have a varied cross-sectional shape over its length. For instance, in some arrangements, the brow bar 113 can be generally cylindrical or tubular and, in other arrangements, the brow bar 113 may transition from generally rectangular, for instance, to generally cylindrical, for instance, back to generally rectangular, for instance, along its length.

Each wire 115 desirably comprises a multiple filament construction. In other words, the wire 115, preferably, comprises more than one filament, fiber or strand, which are generally indicated by reference numeral 118 (see FIG. 7). In some embodiments, the filaments 118 are made from a metal, a metal alloy, a nylon, a polymer, a resin, a natural fiber or another naturally occurring or man-made material that is suitably strong in tension while maintaining sufficient flexibility to secure a lens in a manner described herein. In some embodiments, the wire 115 may be manufactured of a type of fiber-optic material. While a single filament can be used and is practicable, it is currently believed that the multiple filament construction provides greater flexibility while maintaining sufficient strength for use in the manners described herein and, therefore, multiple filament constructions are preferred. Furthermore, multiple filament constructions can increase the friction interface between the lenses and the wire, which friction helps secure the lens orientations relative to the other eyewear components.

The multiple filaments 118 preferably are intertwined, braided or wrapped together to define the wire 115. The wire 115 can be encased within a sheath, cover, jacket or casing 120, if desired. By enclosing the multiple filaments 118 in a casing 120 or the like, the filaments 118 can be better protected against normal wear and tear that might otherwise occur. In one embodiment, the wire 115 is constructed similarly to a braided fishing leader wire.

To provide a rimless appearance, the diameter of the wire should be sufficiently narrow. In some embodiments, the wire 115 has an average diameter of between about 0.1 mm and about 3.0 mm. Preferably, the wire 115 has an average diameter of between about 0.2 mm and about 1.6 mm, and more preferably has an average diameter of between about 0.2 mm and about 0.6 mm, and even more preferably has an average diameter of between about 0.4 mm and about 0.6 mm. In one embodiment, the wire 115 has an average diameter of between about 0.1 mm and about 0.4 mm. In another embodiment, the wire 115 has an average diameter of about 0.4 mm.

With reference to FIG. 2, each wire 115 of the illustrated arrangement advantageously has a free end 116 that can be fed through the corresponding locking unit 117. In the illustrated embodiment, one locking unit 117 is located at, and attached to, each end of the brow bar 113. In some arrangements, the locking unit 117 can be integrally formed with the brow bar 113 or the wire 115. The wire 115, when extended into the locking unit 117, advantageously defines a loop that can encircle a lens of any desired size and shape so long as the loop has a sufficient circumferential length.

Figure 3:
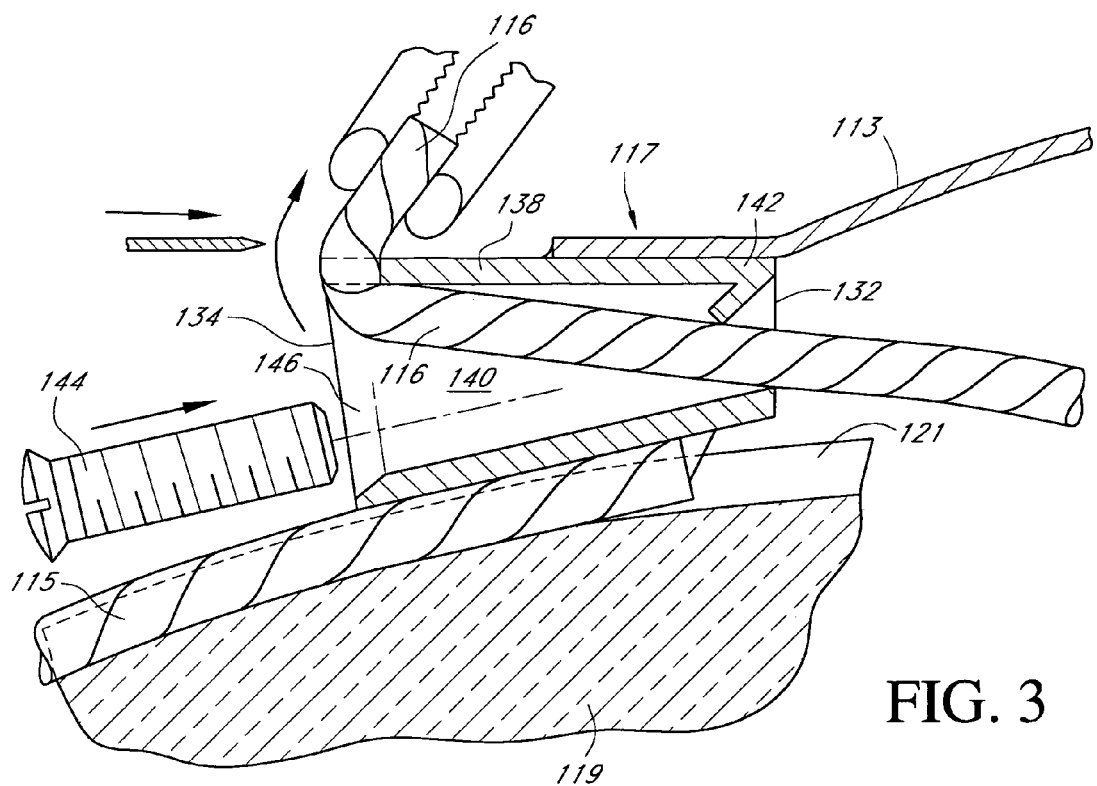
FIG. 3 is an enlarged sectioned view of a portion of the frame assembly of FIG. 1 showing a wire being inserted into a locking unit.
Figure 4:
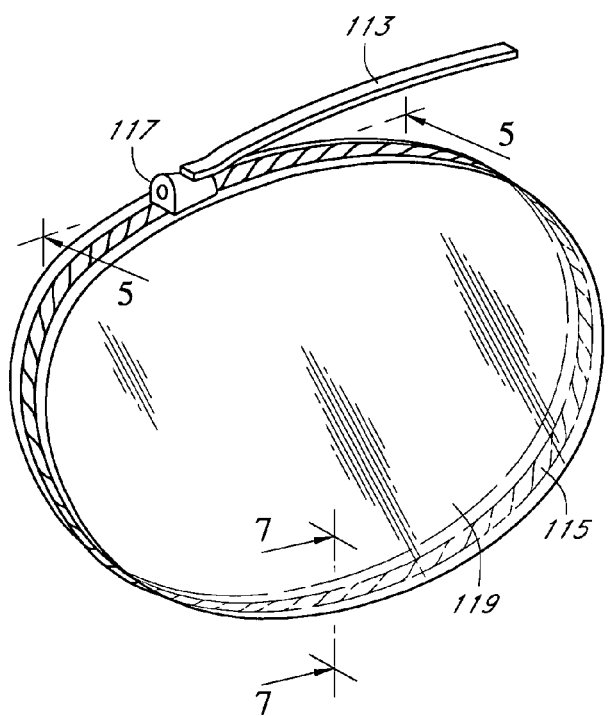
FIG. 4 is a partial perspective view of the frame assembly of FIG. 1 with the lens secured.

With reference to FIG. 6 and FIG. 7, an outer edge 121 of each lens 119 preferably is formed with a channel, furrow, or groove 122 within which at least a portion of the diameter of the associated wire 115 is received. The wire 115, as suggested above, preferably has a length suitable for wrapping about and securing an outer edge 121 of each lens 119, as shown in FIG. 3. Preferably, the diameter of the wire 115 is sufficiently small that a majority of the diameter of the wire 115 can be positioned within the groove 122. Such a positioning reduces the amount of wire visible along the edge 121 of the lens. In one preferred arrangement, the sizing of the groove 122 and the diameter of the wire 115 is such that the wire 115 is substantially to completely recessed within the groove 122. In one particularly preferred arrangement, the depth of the groove 122 is greater than the width of the groove 122 and the width of the groove 122 is about the same as the diameter of the wire 115.

With reference now to FIG. 2 and FIG. 3, each locking unit preferably comprises a housing 130. Preferably, the housing 130 is made of stainless steel, carbide, titanium or some other high performance metal. In some embodiments, the housing 130 can be formed of other suitable materials, including, but not limited to, carbon fiber materials or plastics.

In the illustrated embodiment, the housing 130 comprises a main body that includes, among other portions, an upper roof portion 138. The main body preferably defines a passage 140 that comprises an entrance opening 132 and an exit opening 134. While the passage 140 extends between these two openings 132, 134, it is possible for the passage 140 to extend only partially through the housing 130. The passage 140 advantageously has a size that can accommodate the diameter of the end 116 of the wire 115.

Preferably, a slot 136 is positioned along the passage. The slot 136 of the illustrated arrangement is positioned proximate the opening 134 and along the upper roof portion 138. A pivotally flexible tab 142 depends from the roof portion 138 proximate the opening 132 of housing 130. The tab preferably extends downward into a portion of the passage 140. In a preferred in arrangement, the tab 142 and the slot 136 are positioned along approximately the same side of the housing 130. By such a placement, the operation (discussed below) of both components can be enhanced.

With continued reference to FIG. 1 and additional reference to FIG. 3, a mechanical fastener 144 is adapted to be inserted into the passage 140. The mechanical fastener 144 preferably interacts with the housing 130 in a manner to lock the wire 115 in position within the passage 140. While any suitable mechanical fastener 144 can be used (e.g., wedge, pin, etc.), a screw, such as a set screw, is used in the illustrated arrangement.

The screw 144 in the illustrated embodiment extends into the passage 140 through the opening 134. Preferably, the outer end of the opening 134 includes a counterbore or countersink 146 such that the screw 144 is less noticeable upon assembly. The screw 144, when placed in the opening 146, preferably is sized to extend into the passage 140 through a portion of the passage 140 that is intersected by an imaginary extension of the slot 136. The screw 144 preferably has a tip or a distal end that can pinch the wire 115 between the screw 144 and the body of the housing 130. The pinching of the wire 115 advantageously secures the wire 115 in position within the housing 130.

Furthermore, in the illustrated embodiment, the screw 144 advantageously pinches the wire 115 or cable against the tab 142. Thus, the tab is resiliently displaced, which increases the holding power of the housing 130 on the wire 115. Preferably, the tab 142 is positioned about one diameter of the wire 115 from the end of the screw 144 such that the wire 115 can be secured between the tab 142 and the screw 144. The tab 142 desirably flexes or pivots upward due to the forces imposed by the wire 115 and the screw 144, which further secures the end 116 of the wire 115 in position within the housing 130.

Eyewear, either primary or an auxiliary clip-on type, can be formed with the arrangement of FIGS. 1–7. In assembling eyewear using the illustrated arrangement, a pair of lenses 119 preferably are prepared. During preparation, the channel 121 is formed in the outer perimeter of each lens 119. If the eyewear is to be used as an auxiliary clip-on type of eyewear, the lenses 119 can be similar in size, shape and design to the lenses and/or frame of a wearer's regular or primary eyeglasses. One wire 115 can be wrapped about each lens 119 and positioned within the channel 121. The free end 116 of the wire can be inserted into the opening 132 and into the passage 140 of the corresponding locking unit 117. The end 116 of the wire 115 preferably extends outward of the housing through the opening 134. The end 116 of the wire 115 then can be bent or pulled upward through the slot 136, as shown in FIG. 3. The screw 144 can be inserted and tightened into the passage 140 of the housing 130 such that the wire 115 is secured in position within the housing 130. Excess wire can be removed and this is easiest performed once the end 116 of the wire 115 is secured in position with the screw 144. Desirably, the end of the wire 115 is disposed within the slot 136 and, in one preferred arrangement, the end of the wire 115 is positioned flush along the roof 138 (see FIG. 12).

With reference to FIG. 8, eyewear is illustrated having a frame assembly 111' arranged and configured in accordance with certain features, aspects and advantages of the present invention. The illustrated frame assembly 111' preferably integrates a housing 130', which preferably is similar to the housing 130 discussed above, into a closing member or projection. The projection joins temple members 197' to each of the respective lenses 119'. Preferably, the housing 130 comprises a portion of a locking mechanism like that described above. The threaded member of the locking mechanism preferably is inserted into the housing from the bottom of the housing 130' such that the threaded member is substantially obscured from view. The threaded member, as described above, is used to secure the wire 115' within the housing 130' such that the wire 115' can be used to secure the lenses 119' in position within the frame assembly 111'.

Figure 9:
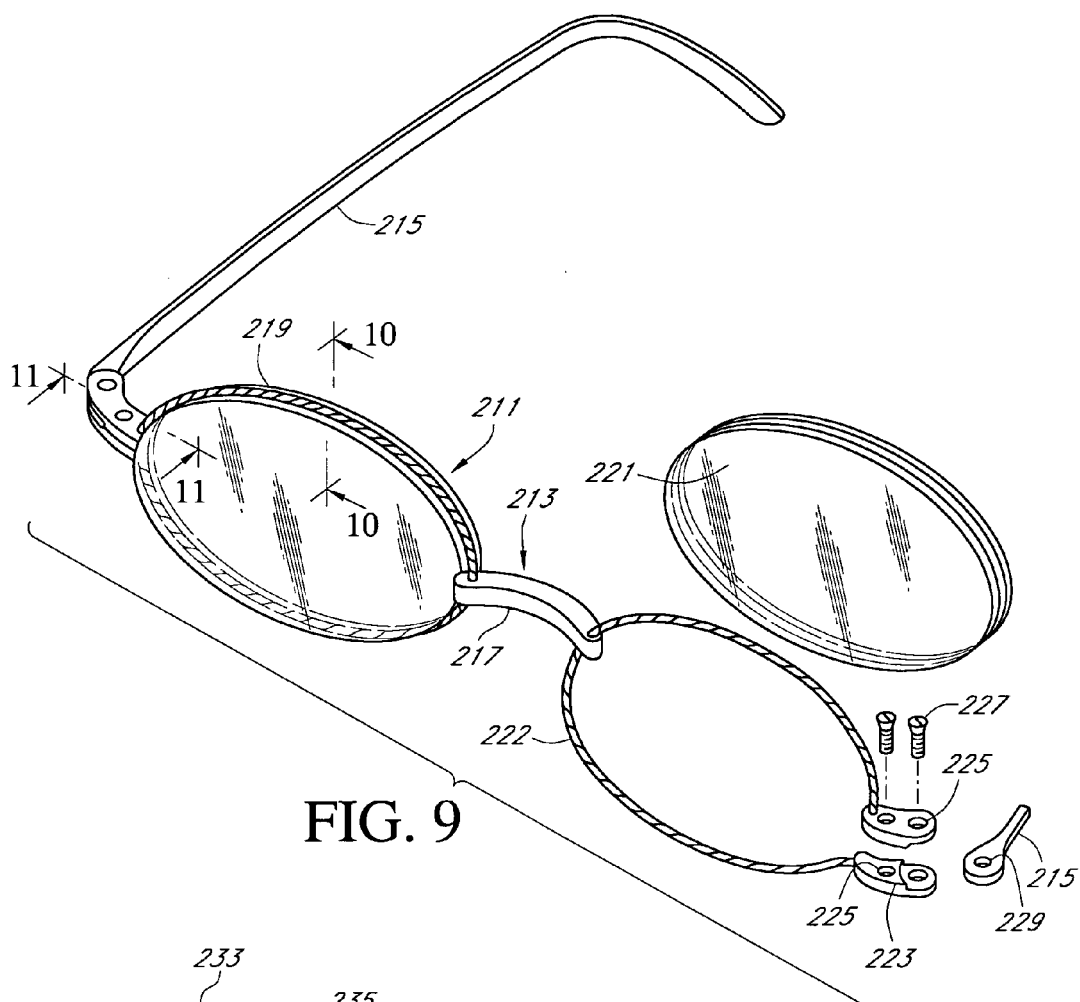
FIG. 9 is a perspective view of another embodiment of a frame assembly having certain features, aspects and advantages of the present invention.
Figure 10:
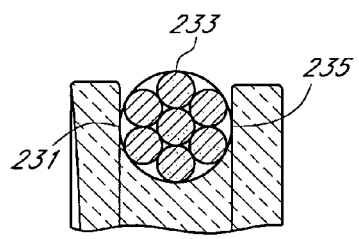
FIG. 10 is a sectioned view of the frame assembly of FIG. 9 taken along line 10—10 of FIG. 9.
Figure 11:
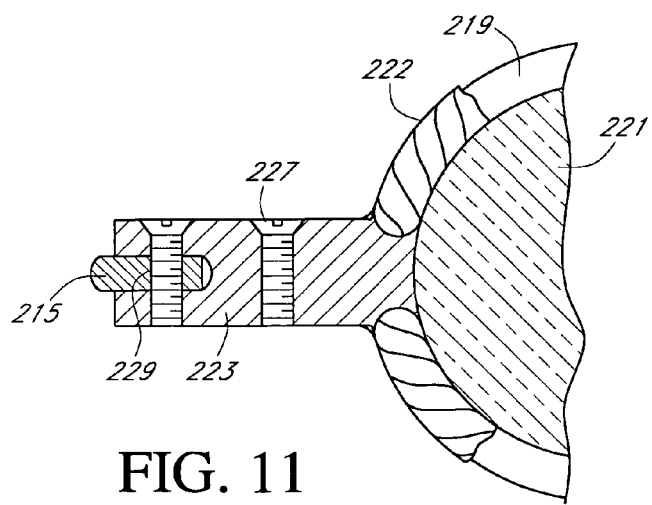
FIG. 11 is a sectioned view of the frame assembly of FIG. 9 taken along line 11—11 of FIG. 9.

With reference now to FIGS. 9–11, another embodiment of a frame assembly 211 that is arranged and configured in accordance with certain features, aspects and advantages of the present invention is illustrated. The illustrated frame 211 comprises a pair of earpieces or temples 215, a bridge or nosepiece 217 and lens holding structures 219. The lens holding structures 219 are sized and configured to receive a pair of lenses 221. In this embodiment, the lens holding structures 219 are of a generally fixed circumferential length, such that the number of shape variations that can be accommodated by this arrangement is significantly less than the number that can be accommodated by the arrangement described above, for instance.

With reference to FIG. 9, each of the lens holding structures 219 preferably comprises a wire 222, which can be configured in any suitable manner, including those set forth above. The illustrated wire 222 comprises a pair of ends that can be selectively secured together. In the illustrated arrangement, the two ends are disposed proximate the temples 215. As such, a pair of closing members 223 is provided for each lens 221 with one closing member 223 of each pair being associated with each of the ends of the wire 222.

With reference to FIG. 11, the ends of the wire 222 preferably are fixed to the closing members 223 in any suitable manner, such as by welding, soldering or the like. In some embodiments, an anchoring arrangement, which is discussed below, can be used for one or both connections. By fixing or attaching, removably or otherwise, both ends of the wire 222 to the closing members 223, the circumferential length of the lens 221 that can be used with the frame assembly 211 becomes defined. While this construction ultimately limits the number of shape combinations that can be accommodated by the frame assembly 211, this construction is advantageous to use in high volume production applications. It should be noted that each of the lenses 221 preferably has an outer edge formed with a groove 231 in which the wire 222 is received. The groove 231 and the wire 222 can be sized and configured as described above.

With reference to FIG. 9 and FIG. 11, each of the closing members 223 preferably comprises two openings 225 through which a threaded fastener 227 may be extended. For instance, the openings 225 in one closing member 223 may be threaded while the holes 225 in the other closing member 223 would not be threaded such that the two closing members 223 can be drawn together when the screws 227 are tightened into the openings 225. In some arrangements, a nut or a threaded sleeve can be used such that tightening the threaded fastener can draw the two closing members 223 toward each other and, more preferably, together.

Figure 15:
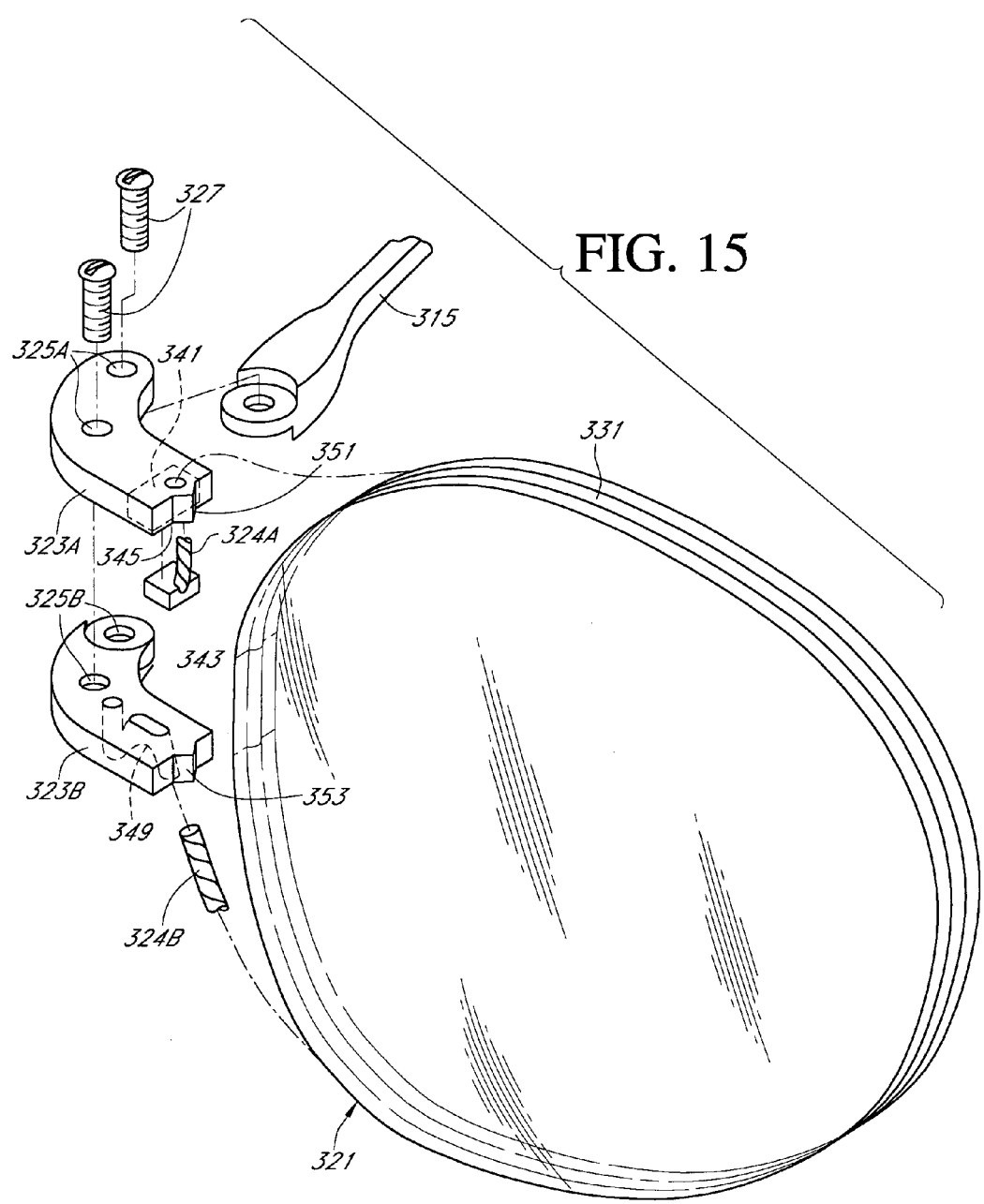
FIG. 15 is an exploded perspective view of a portion of the frame assembly of FIG. 12.

Each of the earpieces or temples 215 preferably is pivotally received between at least a portion of the closing members 223 positioned at the respective end of the frame assembly 211. In other words, each of the temples 215 preferably includes an opening 229 that can be aligned with one set of the openings 225 of the closing members 223. In the illustrated arrangement, the opening 229 is aligned with the outer set of openings 225 of the closing members 223. The screw 227 extends through all three openings so that temple 215 can be secured between the closing members, as shown in FIG. 15. In other arrangements, the temple 215 can underlay or overlay the coupled closing members 223, if so desired. Other suitable manners also can be used to attach the temple and/or to form a temple hinge. For instance, a post can be used that is not aligned with either of the threaded fasteners 227.

The frame 211 advantageously is simple for an optician/technician to assemble due to the use of the illustrated locking mechanism, which is rather simple in form and function. The frame 211 also provides an appearance of a rimless frame assembly while not requiring drilling through the lens of the eyewear. Furthermore, while multiple filament wire is preferred, as described above, a simple monofilament wire, when used with the disclosed constructions, also can be used to secure lenses having varying sizes and configurations within a frame construction that can be generic in appearance. Furthermore, the use of the wire that compresses radially inward on the lenses while the wire is subjected to tensile loading results in a frame that is much lighter and more flexible than an eyewear frame that has a metal or resin based frame body that surrounds a majority or an entirety of the lenses.

With reference now to FIGS. 12–15, another embodiment of a frame assembly 311 that is arranged and configured in accordance with certain features, aspects and advantages of the present invention is illustrated. The frame 311 generally comprises a pair of ear pieces or temples 315, a bridge or nose piece 317, and lens holding structures 319 that receive a pair of lenses 321.

As with the arrangement described directly above, a pair of closing members 323A, 323B extend outward from a peripheral surface of each lens 321. The closing members 323A, 323B each comprise a corresponding pair of openings 325A and 325B through which threaded fasteners 327, such as screws, extend. The temples 315 can be mounted to the closing members 323A, 323B in any suitable manner, including those described above.

In the illustrated embodiment, each lens holding structure 319 comprises a wire 322 having ends 324A and 3248. In one embodiment, the wire 322 has any suitable construction, including but not limited to the arrangement described above. The wire 322 can be received within a groove 331, shown in FIG. 15. The relationship between the groove 331 and the wire 322 can be as set forth above. The groove 331 preferably is sized relative to the wire 322 such that the wire 322 is substantially hidden from view. In one embodiment, the depth of the groove 331 is greater than or about the same as the diameter of the wire 322. In another less preferred embodiment, the depth of the groove 331 is slightly less than the diameter of the wire 322 such that a portion of the wire can be viewed along the outside of the groove.

In the illustrated arrangement, one end 324A of the wire 322 advantageously carries an anchor member 343. As used herein, an anchor is a generally enlarged portion attached to or integrally formed with the wire. The anchor 343 shown in FIG. 14 is generally cubic, rectangular, or the like. The anchor member 363 shown in FIG. 16 is generally spherical or the like. The anchor member 343, 363 can have any suitable configuration and, in a preferred arrangement, the anchor member 343, 363 is sized and configured to complement a socket 341, 365 that receives the anchor member 343, 363. In some embodiments, the anchors can have shapes, such as, for example but without limitation, conical, spherical, oval, etc. Moreover, instead of the end 324A of the wire 322 being fixed to an anchoring member, the end 324A simply can be tied in a knot form or expanded in order to lock the end 324A in a suitably shaped recess 365 formed in the closing member 323A. Desirably, the anchor member and the wire (or the knot and the wire) together define a type of stopper knot locking assembly.

With reference to FIG. 14, one of the closing members, in this case the upper closing member 323A, can be formed with the socket 341, which is accessible from the side of the closing member 323A that mates with the other of the pair of closing members. In this manner, the anchor 343, when placed in the socket 341, can be captured, or secured in position, between the closing members. As shown in FIG. 15, the closing member 323A defines an opening 345 at the surface where the socket 341 is defined within the body of the closing member 323A. As shown in FIG. 16, the size and configuration of the socket 365 can vary and any suitable shapes can be used.

Extending from the recess 341 to an outer surface of the closing member 323A is an opening 347. The wire 322 extends from the anchor through the opening 347 and, therefore, the opening preferably is sized to accommodate the wire 322. In one embodiment, the opening 347 is generally cylindrical in shape. In some arrangements, the opening 347 extends at an angle through the closing member 323A and is generally cylindrical in shape. In one preferred arrangement, the opening 347 extends through a surface of a closing member at a location generally adjacent to the lens 321. Throughout the discussion of the closing members 323A, 323B and the ball and chain attachment mechanisms, it should be recognized that the members and the related components can be inverted, reversed or the like, if desired.

The other closing member 323B preferably is formed with another opening 349. In the illustrated arrangement, the opening 349 undulates and, in one preferred embodiment, the opening 349 breaks through the upper and lower surfaces of the closing member 323B. By extending the opening through the lower surface of the closing member 323B, the wire 322 can be more easily threaded into the closing member 323B. Once threaded into the closing member 323B, the closing members can be brought together and the wire 322 tightened about the lens 321.

By breaking the surface that will be positioned between the closing members 323A, 323B (e.g., the upper surface of the closing member 323B), the opening 349 advantageously allows the two closing members 323A, 323B to squeeze the wire 322 between the closing members 323A, 323B such that the wire 322 can be better secured in position when the threaded members 327 are tightened. To facilitate the squeezing of the wire 322, the opening preferably has a general diameter slightly greater than the diameter of the wire and the depth of the opening in the region in which the opening 349 extends through the surface preferably is slightly less than the diameter of the wire. Moreover, the anchor member 343 preferably is juxtaposed over the opening 349 in the lower closing member 323B such that the anchor member 343, which can extend slightly downward relative to the bottom surface of the upper closing member 323A, can further clamp the wire 322 in position within the lower closing member 323B.

With reference to FIGS. 15 and 16, the illustrated closing members 323A, 323B are formed with tooth elements 351, 353. The tooth elements 351, 353 can be omitted if desired. For instance, FIGS. 17 and 18, which are described in more detail below, illustrate arrangements in which the teeth are omitted. If used, the tooth elements 351, 353 can be vertically aligned with one another and preferably are sized and configured to be received within the groove 331 formed along the outer edge of the lens 321. As illustrated, the tooth elements preferably extend into the portion of the groove defined between the ends 324A, 324B of the wire 322. Thus, the tooth elements 351, 353 advantageously facilitate engagement between the closing members 323A, 323B and the respective lens 321.

Figure 17:
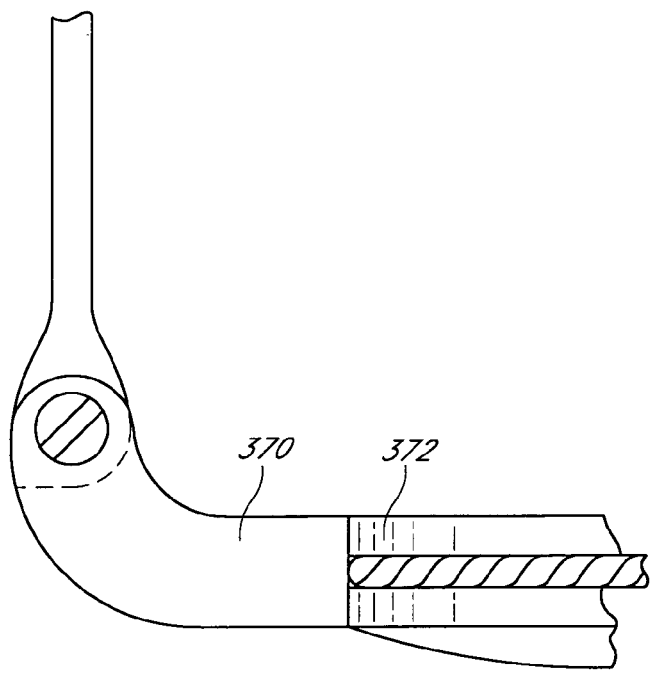
FIG. 17 is a simplified, partial top view of an eyewear construction and a related interface between closing members and a lens.
Figure 18:
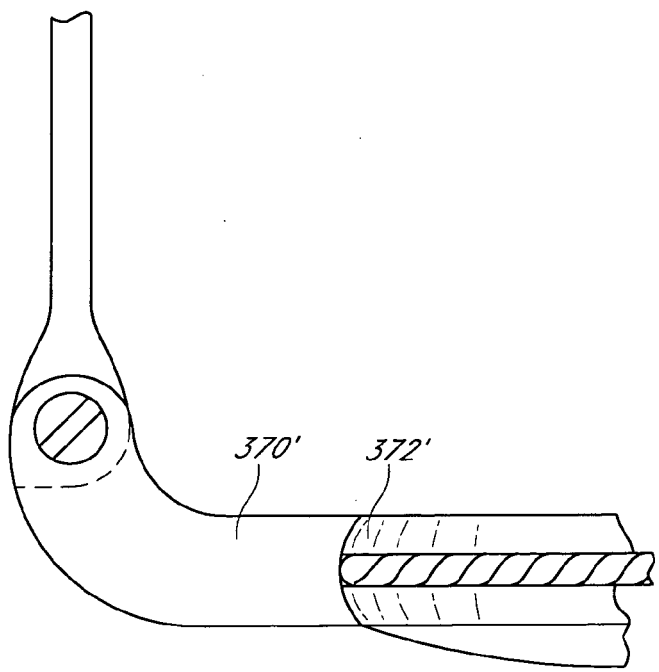
FIG. 18 is a simplified, partial top view of another eyewear construction and a related interface between closing members and a lens.

As discussed directly above, a portion of any closing member construction or projection disclosed herein can be configured to have a raised lip or tooth that fits within a portion of the groove in the peripheral surface of the associated lens. The tooth may reduce the likelihood that the closing member will slide off of the peripheral side of the lens. Thus, the tooth is believed to advantageously enhance the stability of the mounting of the closing member. In some arrangements, however, such as those shown in FIGS. 17 and 18, no teeth are provided and the closing member 370, 370' is provided a generally flush connection with the periphery of the associated lens 372, 372'. As also shown in FIGS. 17 and 18, the periphery of the lenses 372, 372' can be generally square or more rounded (compare FIG. 36 to FIG. 37). Preferably, the contour of the abutting surface of the closing member 370, 370' is shaped to complement the peripheral surface of the associated lens 372, 372'.

Figure 19:
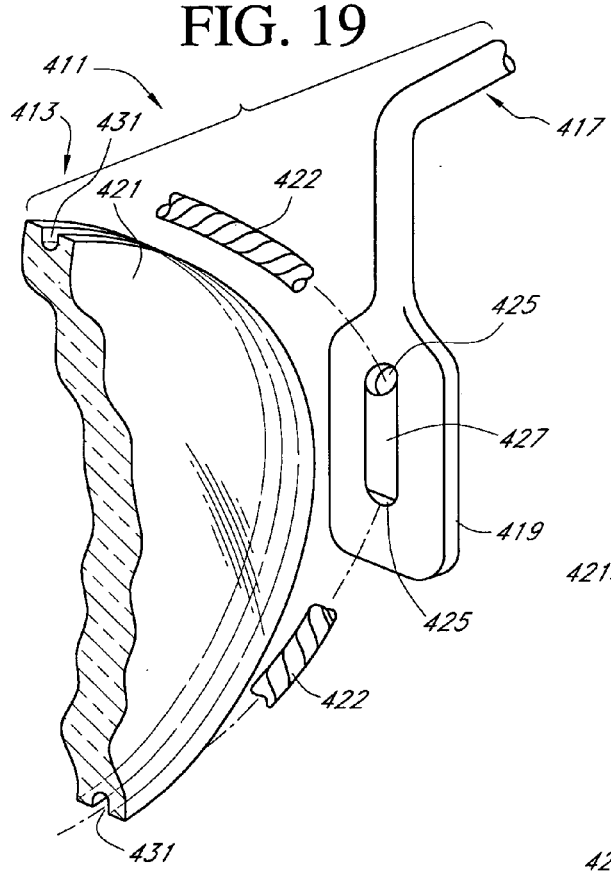
FIG. 19 is an illustration of a bridge construction for eyewear arranged and configured in accordance with some embodiments of the present invention.
Figure 20:
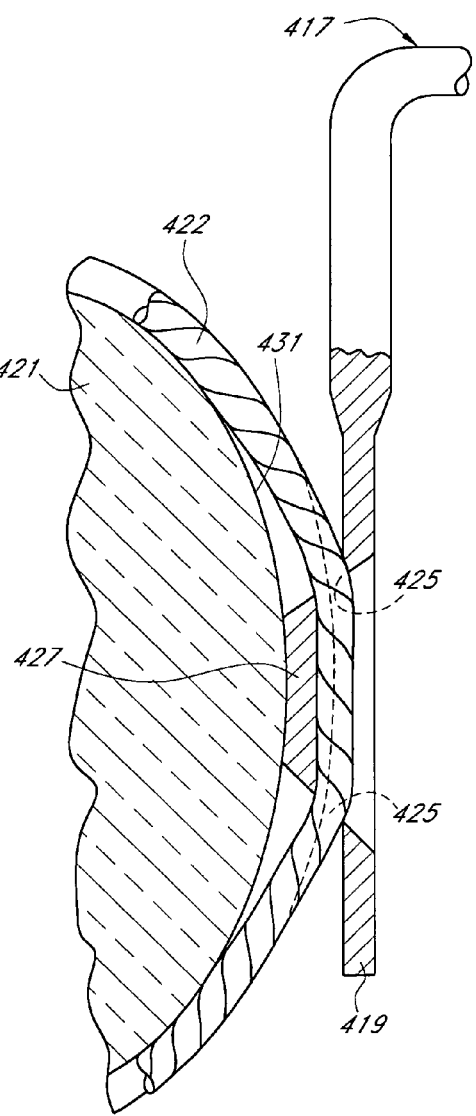
FIG. 20 is a sectioned view of the frame assembly of FIG. 19 illustrating the connection of a nose piece or bridge to a lens.
Figure 21:
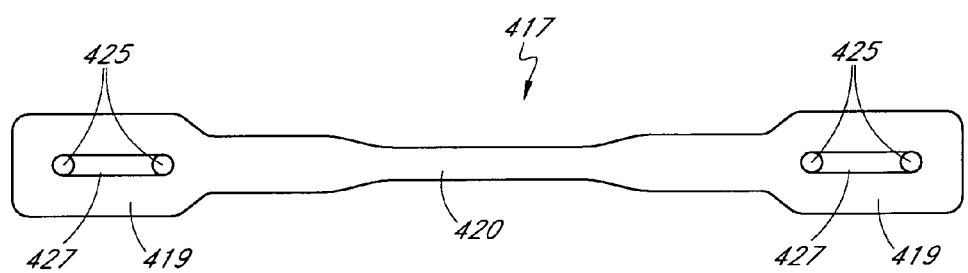
FIG. 21 is a developed view of the bridge of FIG. 19 showing the bridge prior to bending.

With reference now to FIGS. 19–21, a further frame assembly 411 that is arranged and configured in accordance with certain features, aspects and advantages of the present invention is illustrated. While the frame assembly 411 can be used as a clip-on style frame, the frame assembly 411 preferably comprises a pair of ear pieces or temples (not shown), a bridge or nose piece 417, and lens holding members that receive a pair of lenses 421 (one of which is shown). Each lens holding member preferably comprises a wire 422. The wire 422 can be configured in any of the manners and of any of the materials set forth above.

As with the embodiments set forth above, the lens 421 preferably is secured by the wire 422 and the lens 421 preferably has an outer edge formed with a groove 431 that receives the wire 422. The relationship between the groove 431 and the wire 422 can be as set forth above. The cooperation of the wire 422 and the groove 431 preferably results in a rimless appearance for the eyewear. It also should be noted that this embodiment can generally be constructed in any manner set forth herein.

With continued reference to FIGS. 19–21, the illustrated bridge 417 advantageously includes a flexible projection 419 that extends downwardly at each end. A central portion 420 connects the projections 419. The central portion 420 preferably has a generally cylindrical cross-section. The cross-section also can be square or any other suitable shape. A rounded outer contour is preferred for comfort; however, square or other cross-sectional shapes can be used for differing fashion looks. In some embodiments, the central portion 420 can be tubular; however, the solid construction is advantageously thin and still light weight as compared to a tubular central portion 420 that will likely have a larger outer diameter or cross-sectional dimension.

The projection 419 can abut against the outer edge of the corresponding lens 421. Each projection 419 can be formed with a generally vertically extending guide 427. The guide 427 can be wire-shaped or can be shaped like the tooth elements 351, 353, which were described above. Thus, at least a portion of the guide 427 preferably is sized for placement within the groove 431 of the lens 421. Advantageously, a pair of holes 425 can be located at either end of the guide 427 such that the wire 422 can pass through the holes and secure the projection 419 to the side of the lens 421.

With reference now to FIGS. 22–24, eyewear can be constructed in any manner disclosed herein. The wire 422 can be constructed in any manner and of any material set forth above. In the arrangement illustrated in FIG. 22–24, a nose piece or bridge 447 can be formed with a passage 441 through which the wire 422 can extend. In this manner, the bridge 447 can be secured to the lens in a manner similar to the projections 419 described above.

In another embodiment, such as that shown in FIG. 24, the wire 422 can be split and secured to the top and the bottom of the bridge 447. In one embodiment, the wire 422 is soldered, brazed or welded to the bridge 447. Other suitable securing techniques, including mechanical interlocks, such as the ball and chain type, also can be used. While the bridge is shown attached in the embodiments of FIGS. 22–24, the temples can be attached in similar manners. Thus, the constructions disclosed for securing bridges can be used for the closing members and the constructions disclosed for the closing members can be used for the bridges in each of the embodiments disclosed herein.

In addition to the constructions discussed above, any of the eyewear described herein can receive any of a number of other bridge constructions, including those shown in FIGS. 25–30. Both the bridge constructions discussed above and the bridge constructions shown in FIGS. 25–30 facilitate the joining of both lenses. Other bridge designs also can be used if desired.

Figure 25:
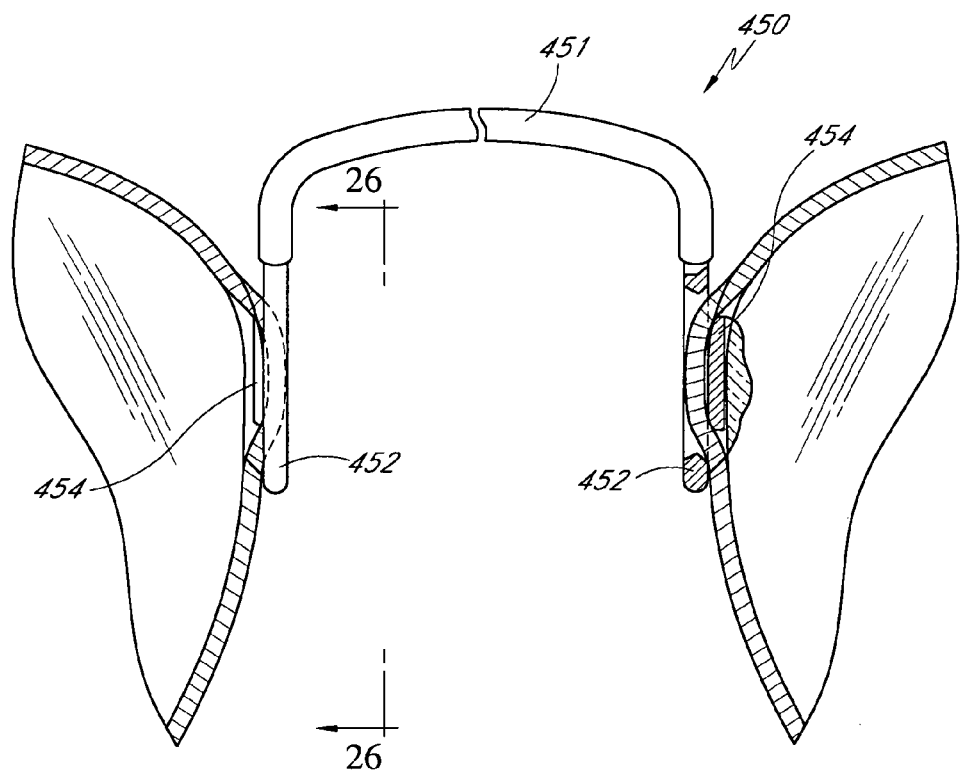
FIG. 25 is an illustration of a bridge construction for eyewear arranged and configured in accordance with some embodiments of the present invention.
Figure 26:
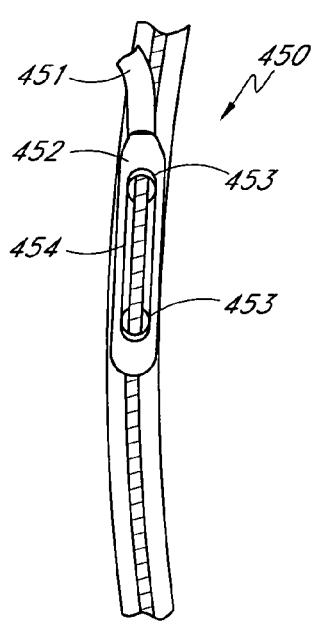
FIG. 26 is a view along the line 26—26 of the bridge construction shown in FIG. 25.

With reference now to FIGS. 25 and 26, a bridge 450 is illustrated therein. The bridge 450 can comprise a central portion 451 and a pair of legs 452. The legs 452 extend generally downward from the central portion 451 and, together with the central portion 451, define a generally inverted U-shaped bridge 450. While other dimensions can be practicable, for a robust design, the legs 452 preferably have a thickness (see FIG. 25) that is at least one wire diameter while the legs 452 preferably have a width (see FIG. 26) that is at least two wire diameters. Moreover, the bridge 450 can have any suitable cross-sectional shape, including portions having differing cross-sections. For instance, the central portion 451 can be cylindrical, tubular, rectangular, square, oval or the like. In addition, the legs 452 can be generally flat but other cross-sectional shapes also can be used.

At least one hole 453 preferably is formed in each of the pair of legs 452. In the illustrated arrangement, two holes 453 are positioned in each of the legs 452. In some embodiments three or more holes can be used. Having two holes 453 is believed to improve the ability of the bridge to remain in position once the associated eyewear is fully assembled and in use. Moreover, in frame assembles that featuring fully adjustable lengths (e.g., lenses of substantially different perimeter dimensions can be accommodated), the position of the bridge 450 along the wire can be fully adjusted into a desired position. Similarly, in frame assemblies featuring the ability to accommodate differing shapes but not necessarily different perimeter dimensions, the bridge 450 can be repositioned relative to the lens shape until a desired positioning is achieved.

The holes 453 preferably are greater than one diameter of the wire and less than two diameters of the wire. In some constructions, the holes 453 can be greater than two diameters of the wire, but such sizing may result in an increased width of the legs 452, which may be less desirable in some eyewear configurations.

The holes 453 preferably are formed with a recessed or inset region 454 of the legs 452 extending between the holes 453. The inset region 454 preferably is sized and configured to be accepted within the groove of the associated lens. Such a construction allows at least a portion of the width legs 452, not necessarily including the inset region 454, to abut a surface of the perimeter of the associated lens. Moreover, in the illustrated arrangement, the wire advantageously does not protrude beyond the legs 452. Such a construction aids in the appearance of a rimless look. In some embodiments, however, the wire can extend slightly beyond the surface of leg 452 such that the wire slightly protrudes from the leg 452. In such constructions, the recess 454 can have a decreased dimension or the legs 452 can have a smaller overall dimension.

In use, the wire can be threaded through the holes 453 prior to assembly of the associated wire and lens components. The bridge 450 can be positioned along the lenses as desired and can be secured in position when the wire is closed in a loop. The wire tension can be adjusted in any manner set forth above and with any suitable construction, including those discussed above.

Figure 27:
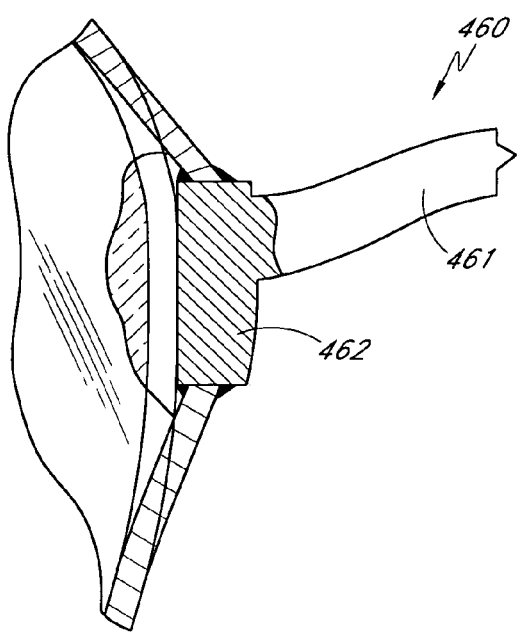
FIG. 27 is an illustration of another bridge construction for eyewear arranged and configured in accordance with some embodiments of the present invention.

With reference now to FIG. 27, a bridge 460 is illustrated therein. The bridge 460 comprises a central portion 461 with a short extension 462 positioned at each end of the central portion 461. In some arrangements, the extensions 462 can be omitted. Moreover, any suitable cross-sectional shapes can be used for the central portion 461 and the extensions 462. In the illustrated arrangement, a pair of wires (or wire portions) are fixed to the extensions 462. The wires (or wire portions) can be fixed in any suitable manner, including but not limited to soldering, welding, adhering, or mechanically interlocking structures. Furthermore, the ends of the wires (or wire portions) can be directly fixed to the central portion 461, if desired. This construction allows the placement of the bridge to be securely fixed relative to the lens when the eyewear is fully assembled. Moreover, this construction facilitates correct alignment of the lens axis because the bridge position is not likely to shift along the length of the wire during or after assembly.

With reference now to FIGS. 28 and 29, a further bridge 470 is illustrated therein. In this arrangement, the bridge 470 generally comprises a central portion 471 and a short extension 472 positioned at each end of the central portion 471. In some arrangements, legs similar to those shown in FIGS. 25 and 26 can be used in place of the extensions 472. Similar to each of the constructions described above, the bridge and its component(s) can have any suitable cross-sectional configuration. Moreover, the cross-sectional configuration can be varied along any portion of the bridge.

A passage 473 preferably extends through at least a portion of each extension 472. In the illustrated arrangement, the passage 473 extends through the full length of the extension 472 but other constructions can feature passages that extend through a limited portion of the extension. Moreover, in some variations, the passage 473 can extend through an end of the central portion 471 and the extensions 472 can be omitted. The passage 473 can have any suitable cross-sectional configuration. In some arrangements, the passage 473 is cylindrical or has an elliptical or oval cross-section. It should be noted that, unless otherwise specified or apparent, diameters of any passages, bores, or other channels or formations that accept the wire preferably are sufficiently greater than the diameter of the associated wire to facilitate movement of the movement therein. Preferably, at least one lateral dimension of the passage 473 is greater than one diameter of the associated wire. Similarly, the extension 472 preferably is larger than at least two diameters of the associated wire such that a robust construction results. The dimensions of the components can be varied as desired.

With respect to the arrangement of FIGS. 28 and 29, the bridge 470 can be used with eyewear having a fixed wire length or a fully adjustable wire length. The bridge 470 can be moved along the length of the wire to achieve a desired bridge placement. Moreover, the bridge can be easily removed from the wire and be replaced on a different wire, which allows the wire to be replaced as needed or desired. The bridge 470 also advantageously allows the connection to the wire to be substantially hidden when the eyewear is fully assembled, which can be desired in some eyewear constructions. The obscured attachment location further enhances the rimless appearance of the eyewear with which the bridge 470 is used.

With reference to FIG. 30, a further bridge 480 is illustrated therein. In this arrangement, as with those described above, the bridge 480 generally comprises a central portion 481 and a short extension 482 positioned at each end of the central portion 481. In some arrangements, legs similar to those shown in FIGS. 25 and 26 can be used in place of the extensions 482. Similar to each of the constructions described above, the bridge and its component(s) can have any suitable cross-sectional configuration. Moreover, the cross-sectional configuration can be varied along any portion of the bridge.

A passage 483 preferably extends through at least a portion of each extension 482. In the illustrated arrangement, the passage 483 extends through the full length of the extension 482 but other constructions can feature passages that extend through a limited portion of the extension 482. Moreover, in some variations, the passage 483 can extend through an end of the central portion 481 and the extensions 482 can be omitted. The passage 483 can have any suitable cross-sectional configuration. In some arrangements, the passage 483 is cylindrical or has an elliptical or oval cross-section. Preferably, at least one lateral dimension of the passage 483 is greater than one diameter of the associated wire. Similarly, the extension 482 preferably is larger than at least two diameters of the associated wire such that a robust construction results. The dimensions of the components can be varied as desired.

While the bridge 480 of FIG. 30 is similar to the bridge 470 of FIG. 29, the bridge 480 of FIG. 30 further includes a wire locking mechanism 485. The locking mechanism 485 comprises a projection 486 that extends through an opening 487. The projection 486 has a length sufficient to contact a portion of the wire that passes through the passage 483. In some arrangements, the projection is formed on a leaf 488. In further arrangements, another projection 489 can be positioned on an opposite side of the leaf 488. This opposing projection 489 preferably is sized and configured to fit within the groove formed in the peripheral surface of the lens. If the portion of the leaf 488 carrying the projections 486, 489 is slightly offset, as in the illustrated arrangement, the opposing projection can be smaller than the diameter of the wire or the depth of the groove in the lens.

The leaf 488 can be secured to the extension 482 with the projection 486 positioned in the opening 487 and the opposing projection 489 extending toward the ultimate position of the lens. Thus, as the lens is positioned and tightened in its location adjacent to the extension 482, the lens contacts the opposing projection 489, which urges the projection 486 through the opening 487 and into engagement with the wire.

Preferably a recess 490 is formed in the passage 483 to allow the wire to be offset into the recess 490. In some arrangements, the recess 490 is formed when the opening 487 is formed through the extension 482. The wire preferably is sufficiently flexible to allow the wire to be offset into the recess when the eyewear is being assembled and the tension is being adjusted on the wire.

With reference now to FIGS. 31–51, several additional embodiments of eyewear assemblies are illustrated therein. The illustrated eyewear assemblies generally relate to primary frame assemblies and auxiliary frame assemblies that are magnetically securable to the primary frame assemblies. As used herein, a magnetic coupling can comprise a pair of magnets or a single magnet and a material that is attracted to the magnet through magnetic forces.

Figure 31:
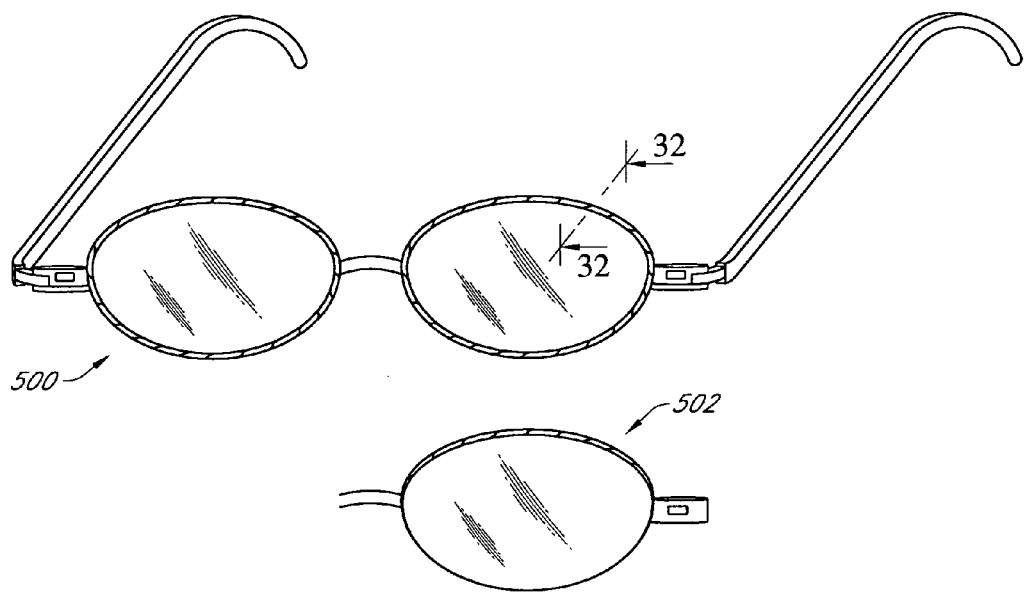
FIG. 31 is a perspective view of a primary eyewear frame with attached temples and a corresponding auxiliary eyewear frame without attached temples in which both frame assemblies are arranged and configured in accordance with certain features, aspects and advantages of the present invention.
Figure 32:
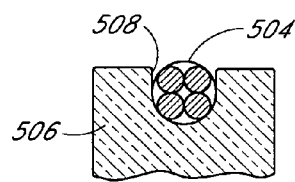
FIG. 32 is a sectioned view taken along line 32—32 of FIG. 31 showing a flexible wire disposed within a groove of a lens.

With reference initially to FIG. 31, a primary frame 500 and a secondary or auxiliary frame 502 as shown. The primary frame 500 and the secondary frame 502 preferably feature a rimless, flexible wire construction, such as those discussed above. In other words, the primary frame 500 comprises a wire 504 that is disposed within a groove 508 that is formed in an outer periphery of a lens 506. The wire 504 can be constructed in any manner and of any materials set forth above. As illustrated in FIG. 32, the wire 504 preferably is sized to be recessed entirely or almost entirely within the groove 508. As such, the wire 504 advantageously is substantially concealed from view and the lenses are thereby mounted in a rimless manner. The wire 504 can be connected to the balance of the frame components (e.g., temples, bridge, etc.) in any suitable manner, such as those set forth above. The secondary frame can be configured in the same or similar manners.

Figure 33:
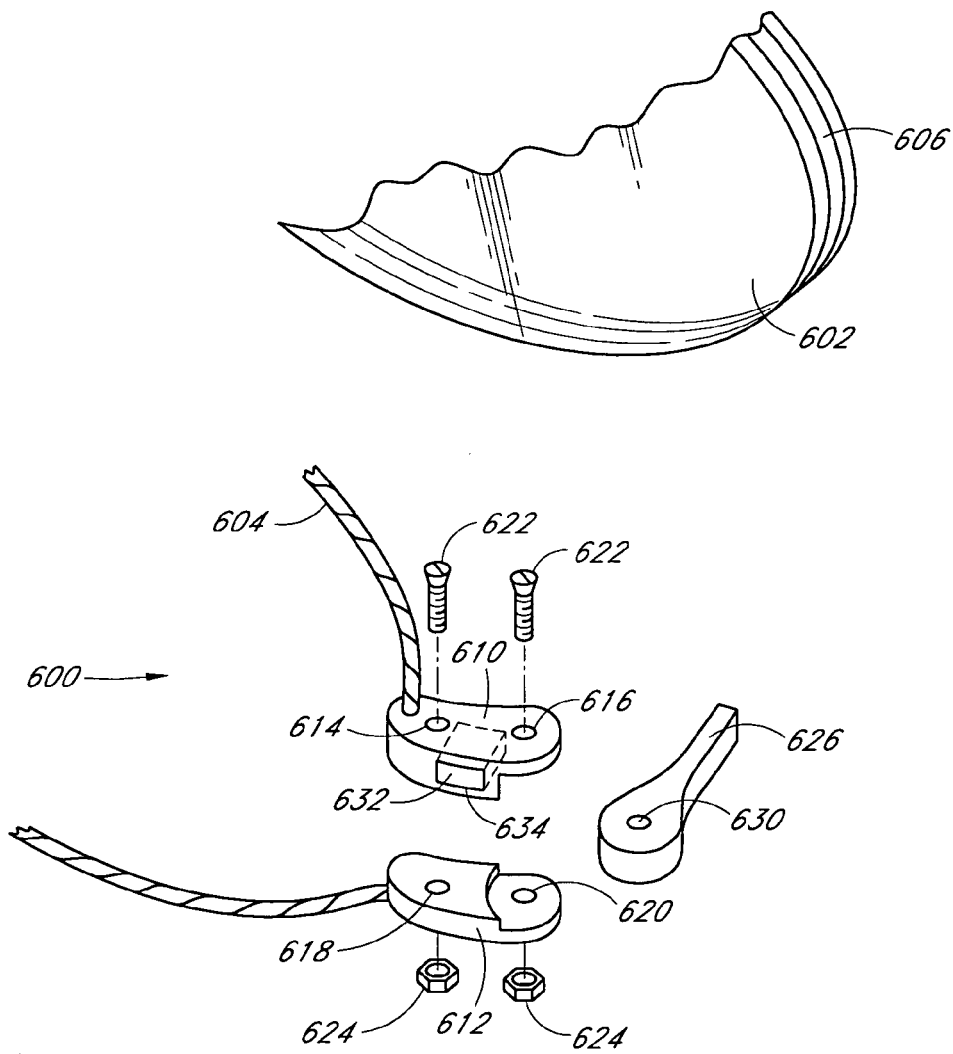
FIG. 33 is an exploded view of an embodiment of a frame assembly having certain features, aspects and advantages of the present invention and comprising a lens holding structure closing mechanism that incorporates a magnetic member.

With reference now to FIG. 33, a primary frame 600 is illustrated in an exploded manner. A lens 602 can be mounted in a suitable manner with a wire 604 that forms a lens supporting structure. In the illustrated arrangement, the lens 602 comprises a groove 606 that extends around a periphery of the lens 602. As discussed above, the groove preferably allows the wire 604 to be substantially hidden from view. In some embodiments, the wire 604 may be only partially recessed such that the wire 604 forms a decorative element of the eyewear. Presently, however, the rimless appearance of the eyewear is desired and, thus, the wire 604 desirably is substantially recessed from view. Furthermore, the wire 604 can be constructed in any manner and of any materials set forth above.

With continued reference to FIG. 33, two portions of the wire 604 that encircles each lens 602 are connectable using a pair of closing members 610, 612. As mentioned above, the upper and lower members 610, 612 can be inverted, if desired. The upper closing member 610 comprises a pair of holes 614, 616 and the lower closing member also comprises a pair of holes 618, 620. The hole 614 and the hole 618 preferably are aligned while the hole 616 and the hole 620 preferably are aligned. The holes 614, 616, 618, 620 accommodate threaded fasteners 622. In the illustrated arrangement, the fasteners (e.g., screws) 622 cooperate with nuts 624 to allow the two members 610, 612 to be tightened together. In some embodiments, the nuts 624 can be obviated by tapping one of the holes of each respective pair of holes or by provided a threaded sleeve, for instance. It also should be noted that throughout the application, any threaded fastener can be replaced by a suitable fastening arrangement, including but not limited to, snap-fit assemblies or components or press-fit components.

In the illustrated arrangement, the closing members 610, 612 accommodate a portion of a temple member 626. The temple member can include a hole 630 that aligns with one of the pair of holes, such as the holes 616, 620. In this manner, the temple can be pivotally attached to the members 610, 612. Other suitable manners of connecting the temple 626 to the wire 604 also can be used, including but not limited to those discussed above.

With continued reference to FIG. 33, a magnetic member 632 is disposed within a recessed chamber in the closing members 610, 612. The magnetic members 632 can have any suitable size or shape. The magnetic member 632 can be embedded in at least one of the closing members 610, 612, can be secured by adhesives or the like to at least one of the closing members 610, 612 or can be secured in a secondary housing or sleeve that is, in turn, secured to at least one of the closing members 610, 612. Other suitable manners of connecting the magnetic member to the frame 600 also can be used.

The magnetic members 632 can attach to another magnetic member through direct contact or via an intervening surface. As such, magnetically connected means that the magnetic members allow two components to be connected by magnetic force regardless of whether the magnetic members actually make physical contact. In addition, the magnetic members 632 can be recessed, mounted flush or protrude from the surface to which or in which they are mounted.

In one embodiment, the closing members 610, 612 can be formed of a magnetizable member (e.g., a ferrous metal such as iron or steel) such that the closing members themselves may become magnetized. In such an embodiment, a fully concealed magnet could be used. In the illustrated embodiment, the recess extends through a forward facing surface of at least one of the closing members 610, 612 thereby forming a window or the like. The window 634 can be used to allow the magnetic field to be exposed in a desired direction (e.g., forward or rearward in the illustrated arrangement). The use of "window," however, does not necessarily mean that the magnet is visually exposed but, rather, means that the effects of the magnetic member (e.g., magnetic field) can be detected at this location. The window can simply be an opening through which the magnetic member is embedded into the closing member or can simply expose a portion of the magnetic member, which would be inserted from a different side of the closing member.

Figure 34:
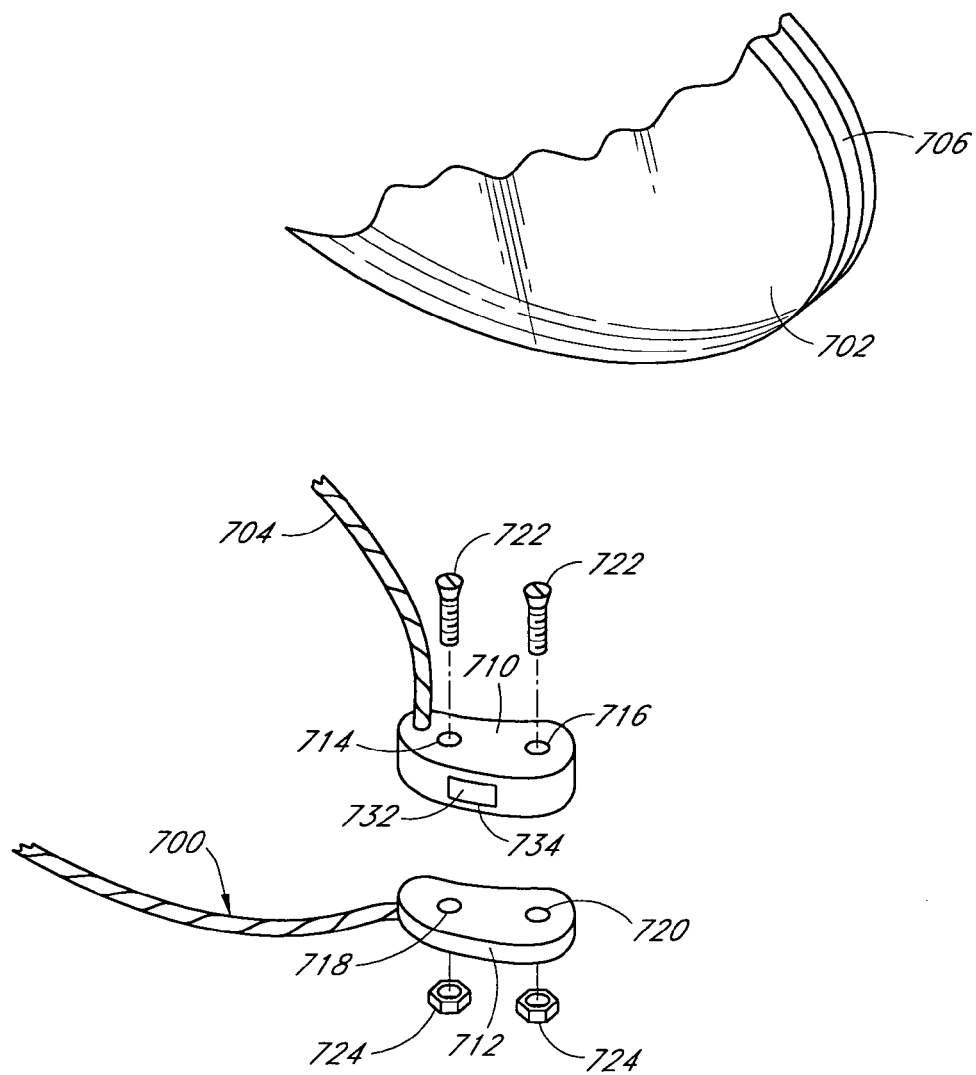
FIG. 34 is an exploded view of an embodiment of a frame assembly having certain features, aspects and advantages of the present invention and comprising another lens holding structure closing mechanism that incorporates a magnetic member.

With reference now to FIG. 34, a secondary frame 700 is illustrated. The secondary frame 700 can be configured in a similar manner to the primary frame 600 described above. A lens 702 can be mounted in a suitable manner with a wire 704 that forms a lens supporting structure. In the illustrated arrangement, the lens 702 comprises a groove 706 that extends around a periphery of the lens 702. As discussed above, the groove 706 preferably allows the wire 704 to be substantially hidden from view. In some embodiments, the wire 704 may be only partially recessed such that the wire 704 forms a decorative element of the eyewear. Presently, however, the rimless appearance of the eyewear is desired and, thus, the wire 704 desirably is recessed from view. Furthermore, the wire 704 can be constructed in any manner and of any materials set forth above.

With continued reference to FIG. 34, two portions of the wire 704 that encircles each lens 702 are connectable together using a pair of closing members 710, 712. The upper closing member 710 comprises a pair of holes 714, 716 and the lower closing member 712 also comprises a pair of holes 718, 720. The hole 714 and the hole 718 preferably are aligned while the hole 716 and the hole 720 preferably are aligned. The holes 714, 716, 718, 720 accommodate threaded fasteners 722. In the illustrated arrangement, the fasteners (e.g., screws) 722 cooperate with nuts 724 to allow the two closing members 710, 712 to be tightened together. In some embodiments, tapping one of the holes of each respective pair of holes or providing a threaded sleeve, for instance, can obviate the nuts 724.

With continued reference to FIG. 34, a magnetic member 732 preferably is disposed within a recessed chamber in the closing members 710, 712. The magnetic member 732 can be embedded in at least one of the closing members 710, 712, can be secured by adhesives or the like to at least one of the closing members 710, 712 or can be secured in a secondary housing or sleeve that is, in turn, secured to at least one of the closing members 710, 712. Other suitable manners of connecting the magnetic member to the frame 700 also can be used. In one embodiment, the closing members 710, 712 can be formed of a magnetizable member (e.g., a ferrous metal such as iron or steel) such that the closing members themselves may become magnetized. In such an embodiment, a fully concealed magnet could be used. In the illustrated embodiment, the recess extends through a forward facing surface of the at least one of the closing members 710, 712 thereby forming a window or the like. The window 734 can be used to allow the magnetic field to be exposed in a desired direction (e.g., rearward or forward in the illustrated arrangement).

With reference now to FIGS. 35–37, a portion of another embodiment of an eyewear assembly 800 arranged and configured in accordance with certain features, aspects and advantages of the present invention is illustrated therein. The eyewear 800 features another closing arrangement 802. The closing arrangement 802, similar to some of the arrangements set forth above, allows for the usage of a single stock frame assembly that can accommodate lenses of various sizes and shapes. The illustrated closing arrangement 802 also provides the added capability of use in a magnetically securable manner. For instance, if the arrangement is used for a primary frame, a magnetically securable secondary frame can be used and vice versa.

In the illustrated arrangement, a lens 804 features a peripheral groove 806. The groove 806 is sized and shaped to accommodate a wire 808, as described above. The groove 806 and the wire 808 can have any suitable configuration, including those set forth above. The wire 808 preferably has one end 810 that is secured to one of a pair of closing members 812, 814. In the illustrated arrangement, the end 810 of the wire 808 is soldered, welded, mechanically locked, or the like to the lower closing member 814. The other of the closing members 812, 814, which is the upper closing member 812 in the illustrated arrangement, comprises a through passage 820.

The illustrated through passage 820 is aligned with a sharply turned passage 822 that is formed along an upper surface 824 of the lower closing member 814. The upper surface 824 of the illustrated lower closing member 814 abuts a lower surface 826 of the upper closing member 812 such that the wire 808, when positioned within the passage 822 can be secured in position by compressive forces that result when the two closing members 812, 814 are tightened together. For this reason, the passage 822 preferably is slightly shallower than the diameter of the wire 808 and the closing members 812, 814 are secured together in a manner that allows them to be drawn together (e.g., with threaded fasteners 830).

As discussed above, at least one of the closing members 812, 814 preferably contains or is formed of a magnetic member 832. The magnetic member 832 can be positioned proximate a window 834 or the like. Furthermore, the magnetic member 832 can be mounted in any manner set forth herein. In one embodiment, the magnetic member 832 is disposed within a recessed chamber in the closing members 812, 814. The magnetic member 832 can be embedded in at least one of the closing members 812, 814, can be secured by adhesives or the like to at least one of the closing members 812, 814 or can be secured in a secondary housing or sleeve that is, in turn, secured to at least one of the closing members 812, 814. Other suitable manners of connecting the magnetic member to the frame 800 also can be used. In one embodiment, the closing members 810, 812 can be formed of a magnetizable member (e.g., a ferrous metal such as iron, steel, or the like) such that the closing members themselves may become magnetized. In such an embodiment, a fully concealed magnet could be used. In the illustrated embodiment, the recess extends through a forward facing surface of at least one of the closing members 812, 814 thereby forming the window 834 or the like. The window 834 can be used to allow the magnetic field to be exposed in a desired direction (e.g., forward in the illustrated arrangement).

While the illustrated arrangement shows a temple 836 and the associated recess within the closing members 812, 814, it is anticipated that the eyewear assembly 800 can be used in configurations not featuring temples. In addition, the closing members can be used on a bridge or the like.

With the embodiment illustrated in FIGS. 35–37, the upper closing member 812 can be easily removed such that the magnetic member 834 can be easily removed from the frame 800, if desired. Such a construction enables a consumer to have magnetic eyewear or to not have magnetic eyewear while the eyewear manufacturer simply changes one very small part. Furthermore, opticians can maintain a stock of both magnetic and nonmagnetic closing members to simply and readily accommodate the desires of its customers.

Figure 40:
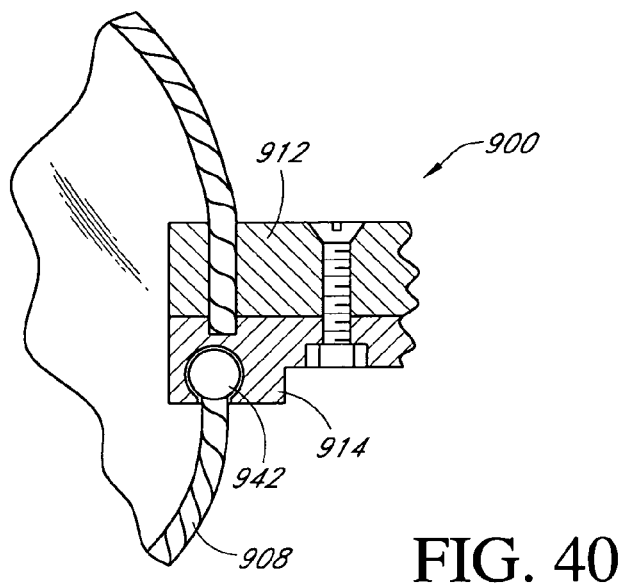
FIG. 40 is a perspective view of an embodiment of a frame assembly having certain features, aspects and advantages of the present invention and incorporating a lens holding structure closing mechanism featuring the lower closing member of FIG. 39.
Figure 38:
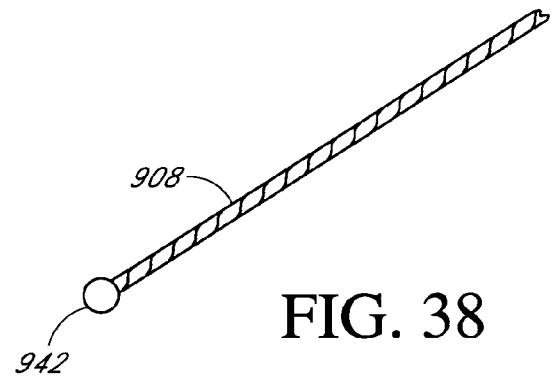
FIG. 38 is a perspective view of a wire with a balled end that can be used with certain embodiments that are arranged and configured in accordance with certain features, aspects and advantages of the present invention.
Figure 39:
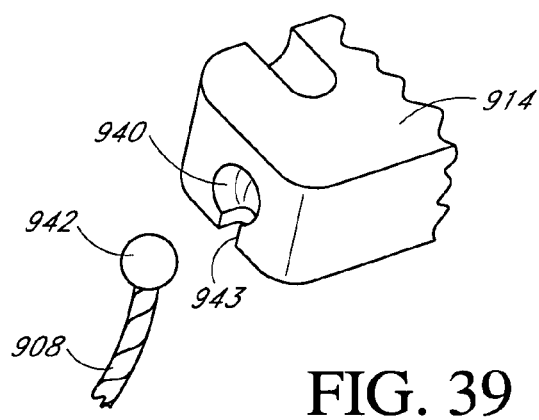
FIG. 39 is a perspective view of an embodiment of a frame assembly having certain features, aspects and advantages of the present invention and incorporating a lower closing member of a mechanism using the wire of FIG. 38.

With reference now to FIGS. 38–40, a portion of another embodiment of an eyewear assembly 900 arranged and configured in accordance with certain features, aspects and advantages of the present invention is illustrated therein. The eyewear assembly 900 features another closing arrangement 902. The closing arrangement 902 is very similar to the closing arrangement 802 of the eyewear 800 discussed directly above. Rather than fully describing each component of the eyewear 900, a lower closing block 914 will be described to illustrate a difference between the closing member 814 of the eyewear 800 and the closing member 914 of the eyewear 900.

The closing member 914 preferably features a recess 940 that cooperates with an enlarged end 942 of a wire 908. In the illustrated arrangement, the recess 940 is generally spherical and the enlarged end 942 is generally spherical, however, other geometries can be used such as those described elsewhere herein. The recess 940 also communicates with a short passage 944 that allows the enlarged end 942 to be slipped into the recess 940 while the short passage 944 accommodates the end of the wire 908 that extends away from the enlarged end 942. This arrangement allows easy replacement of the wire 908 when a wearer wishes to change lens shape or size or when other circumstances warrant the eyewear 900 being disassembled and reassembled.

Figure 41:
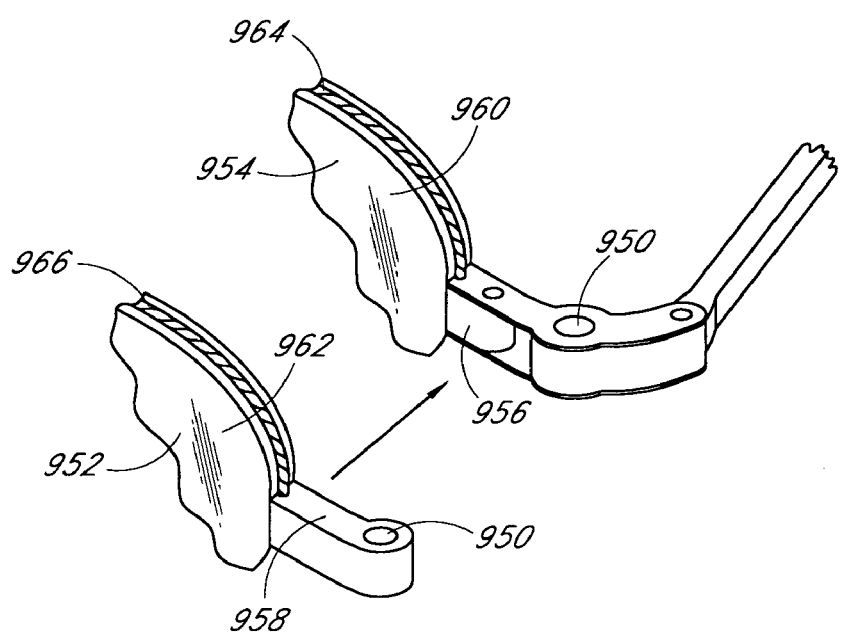
FIG. 41 is a partial perspective view of a further embodiment of a frame assembly having certain features, aspects and advantages of the present invention and incorporating magnetic members generally vertically aligned.

With reference now to FIG. 41, an embodiment is illustrated in which magnetic members 950 are disposed in an orientation for coupling of a rimless auxiliary frame 952 to a rimless primary frame 954. In the illustrated arrangement, the magnetic members 950 are shown with an overlapping configuration such that one is positioned vertically above the other. The magnetic members 950 preferably are disposed on or in a pair of arms 956, 958 that are secured to the respective lenses 960, 962 by a respective wire 964, 966 in any of the manners described above. While both sets of frames features the wire connection, one of the frames could have a more conventional frame not featuring a rimless look. Furthermore, in some embodiments, the orientation of the auxiliary frame 952 relative to the primary frame 954 can be interchanged such that the arms of the primary frame 954 extend over the arms of the auxiliary frame 952. Moreover, the connection point between the primary frame and the auxiliary frame can be varied (e.g., connection between the back of the primary frame and a portion of the auxiliary frame, connection between the top of the primary frame and a portion of the auxiliary frame, connection between the bottom of the primary frame and a portion of the auxiliary frame, connection between an outside surface of the primary frame and a portion of the auxiliary frame, connection between an inside surface of the primary frame and a portion of the auxiliary frame, etc.)

With reference now to FIGS. 42–45, a portion of another embodiment of an eyewear assembly arranged and configured in accordance with certain features, aspects and advantages of the present invention is illustrated therein. The eyewear assembly 1000 features another closing arrangement 1002. The closing arrangement 1002 comprises a single block 1004 rather than a split closing block formed of two or more components. The single block arrangement greatly simplifies assembly and construction. Moreover, manufacturing costs can be decreased using the single block arrangement of FIGS. 42–45.

The single block 1004 preferably features a recess or socket 1040 that cooperates with an enlarged end 1042 of a wire 1008. In the illustrated arrangement, the recess 1040 is generally spherical and the enlarged end 1042 is generally spherical, however, other geometries can be used such as those described elsewhere herein. The recess 1040 also communicates with a short passage 1044 that allows the enlarged end 1042 to be slipped into the recess 1040 while the short passage 1044 accommodates the end of the wire 1008 that extends away from the enlarged end 1042. This arrangement allows easy replacement of the wire 1008 when a wearer wishes to change lens shape or size or when other circumstances warrant the eyewear 1000 being disassembled and reassembled.

A second passage 1020 extends through at least a portion of the block 1004. In the illustrated arrangement, the second passage 1020 extends downward through the block 1004 at an angle. The angle eases assembly and allows the end of the wire 1008 to extend through a lower surface of the block, which is an area less likely to be visible while the eyewear is worn. Other orientations of the passage also are practicable. The passage preferably is slightly oversized relative to the wire diameter but need not be oversized by any significant amount.

With reference to FIG. 43, a threaded opening 1022 intersects a portion of the second passage 1020. The threaded opening 1022 receives a set screw 1024 or the like. In some arrangements, the opening 1022 can penetrate beyond the passage 1020 such that a slight recess is formed opposite the wire 1008 from the set screw 1024. In use, the wire 1008 can be tensioned and locked into position with the set screw. If a sufficient recess is provided opposite of the set screw, the set screw can offset a portion of the wire 1008 to allow slight adjustment of the tension or the length of the associated loop.

With reference now to FIGS. 46–50, a portion of a further embodiment of an eyewear assembly arranged and configured in accordance with certain features, aspects and advantages of the present invention is illustrated therein. The eyewear assembly 1000' features another closing arrangement 1002'. The closing arrangement 1002' is similar to the arrangement of FIGS. 42–45 with the exception that both ends of the wire 1008' extend through passages 1020' and are secured with set screws 1024'. Further description is believed unnecessary.

Although the present invention has been disclosed in the context of certain preferred embodiments, examples and variations, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. For instance, the exterior shape and dimensions of the closing members, housings or projections can be any suitable shape or configuration, including the use of curved or straight surfaces in the place of straight or curved surfaces so long as the wire and/or any tensioning components can be properly attached thereto, positioned there within or associated therewith. Moreover, any of the closing members, housings or projections described herein can have legs or projections that extend along a portion of the lens surface, for aesthetic reasons and/or to add additional desired support to the assembly by increasing the contact area between the component and the respective lens.

It is also contemplated that various combinations or subcombinations of the specific features and aspects of the embodiments may be made and still fall within the scope of the invention. It should be understood that various features and aspects of the disclosed embodiments can be combined with or substituted for one another in order to form varying modes of the disclosed invention. Moreover, some variations that have been described with respect to one embodiment and not another embodiment can be used with such other embodiments. Many other variations also have been described herein and cross-application is intended where physically possible. Thus, it is intended that the scope of the present invention herein disclosed should not be limited by the particular disclosed embodiments described above, but should be determined only by a fair reading of the claims that follow.

What is claimed is:

1. An eyewear system comprising at least one eyewear lens having an end surface that defines a perimeter of said lens, a multiple filament wire extending around said perimeter, said perimeter having a total length and said multiple filament wire extending around at least about ninety percent of said total length.

2. The system of claim 1, wherein said multi-filament construction comprises a plurality of filaments surrounded by an outer casing.

3. The system of claim 2, wherein at least one of said plurality of filaments comprises a material selected from the group consisting of a metal, a metal alloy, a nylon, a polymer, a resin, a natural fiber or a man-made fiber.

4. The system of claim 1, wherein said multiple filament wire has a thickness of between about 0.1 and about 3.0 mm.

5. The system of claim 4, wherein said multiple filament wire has a thickness of between about 0.1 and about 0.6 mm.

6. The system of claim 1, wherein said multiple filament wire has a thickness of between about 0.2 and about 1.6 mm.

7. The system of claim 6, wherein said multiple filament wire has a thickness of between about 0.2 mm and about 0.4 mm.

8. The system of claim 7, wherein said multiple filament wire has a thickness of about 0.4 mm.

9. The system of claim 1 further comprising a brow bar and a locking unit that is mounted to said brow bar.

10. The system of claim 9, wherein said locking unit is positioned at an end of said brow bar.

11. The system of claim 9, wherein said brow bar is formed of a material selected from the group consisting of a metal, a metal alloy and a metal composite.

12. The system of claim 9, wherein said multiple filament wire has a first end and a second end and both said first and second ends are connected to said locking unit.

13. The system of claim 12, wherein at least a portion of said locking unit includes a magnet or a material that is attracted by a magnet.

14. The system of claim 12, wherein said multiple filament wire is connected at said first end to an exterior surface of said locking unit.

15. The system of claim 12, wherein said multiple filament wire is connected at said first end to an interior surface of said locking unit.

16. The system of claim 12, wherein said locking unit comprises a housing and said housing is formed of a metal material.

17. The system of claim 16, wherein said metal is selected from the group consisting of stainless steel, carbide, or titanium.

18. The system of claim 12, wherein said locking unit comprises a housing and said housing is formed of a carbon fiber or plastic material.

19. The system of claim 1 further comprising a groove being positioned within said end surface and extending around at least a majority of said perimeter, said multiple filament wire being positioned within said groove.

20. The system of claim 19, wherein said multiple filament wire has a diameter and said groove has a depth, said depth being substantially the same as said diameter.

21. The system of claim 19, wherein said multiple filament wire has a diameter and said groove has a depth, said depth being slightly shallower than said diameter.

22. The system of claim 1 further comprising a looking unit, said locking unit comprising a housing defining a passage and said multiple filament wire extending through at least a portion of said passage.

23. The system of claim 22, wherein said housing further comprises an opening defined through a wall of said housing, said opening intersecting at least a portion of said passage and said opening sized to receive said multiple filament wire.

24. The system of claim 23 further comprising a threaded member, said passage comprising a threaded portion and said threaded member extending through said portion of said passage that is intersected by said opening.

25. The system of claim 24 further comprising a flexible member that extends into a portion of said passage that said threaded member does not extend into.

26. The system of claim 1, wherein said wire is selectively adjustable to secure lenses of various shapes.

27. The system of claim 1, wherein said wire is selectively adjustable to secure lenses of various sizes and shapes.

28. An eyeglass frame assembly comprising a first lens and a second lens, said first lens being substantially encircled by a first multiple filament wire, said second lens being substantially encircled by a second multiple filament wire, said first multiple filament wire and said second multiple filament wire being connected by a bridge, said first multiple filament wire having a first end and a second end, said second multiple filament wire having a first end and a second end, a first closing member being connected to said first multiple filament wire and connecting said first end of said first multiple filament wire to said second end of said first multiple filament wire, a second closing member being connected to said second multiple filament wire and connecting said first end of said second multiple filament wire to said second end of said second multiple filament wire.

29. The system of claim 28, wherein at least a portion of one of said closing members includes a magnet or a material that is attracted by a magnet.

30. The assembly of claim 28, wherein said first closing member comprises a first portion and a second portion and said second closing member comprises a first portion and a second portion, said first portion and said second portions of said first closing member being connected together and said first and second portions of said second closing member being connected together.

31. The assembly of claim 30, wherein said first and second portions of said first closing member are connected with at least one threaded fastener and said first and second portions of said second closing member are connected with at least one threaded fastener.

32. The assembly of claim 30 further comprising a first temple that is secured to said first closing member and a second temple that is secured to said second closing member.

33. The assembly of claim 32, wherein said first temple member is secured between said first and second portions of said first closing member and said second temple is secured between said first and second portions of said second closing member.

34. The assembly of claim 30, wherein said first end of said first wire comprises an anchor and said first portion of said first closing member comprises a corresponding recess such that said anchor is secured in said recess when said first and second portions of said first closing member are secured together.

35. The assembly of claim 34, wherein said anchor is spherical in shape.

36. The assembly of claim 34, wherein said anchor is rectangular in shape.

37. The assembly of claim 34 further comprising an opening that extends through said first portion of said first closing member, said opening intersecting said recess.

38. The assembly of claim 37, wherein said recess is disposed in a surface that faces said second portion of said first closing member and said opening extends at an angle toward an opposing surface of said first portion of said first closing member.

39. The assembly of claim 34, wherein said second portion of said first closing member comprises an opening, said wire extending through said opening and said wire being locked in position relative to said second portion when said first and second portions of said first closing member are secured together.

40. The assembly of claim 39, wherein said opening through said first member extends through a surface that faces said second member of said first closing member when said first and second portions of said first closing member are secured together.

41. The assembly of claim 30, wherein said first portion of said first closing member has a first opening and said second portion of said first closing portion has a second opening, said first and second openings being generally aligned, said second opening extending at an angle relative to said first opening and said second opening being exposed on a surface of said second portion of said first closing member such that said wire is captured within said second opening by a surface of said first portion of said first closing member when said first and second portion are connected.

42. The assembly of claim 41, wherein said first portion is removable from said assembly and replaceable with an alternative first portion.

43. The assembly of claim 42 further comprising a first temple, said first temple being connected to said first closing member.

44. The assembly of claim 42, wherein said first wire is secured to said second portion of said first closing member.

45. The assembly of claim 44, wherein said first wire is welded to said second portion of said first closing member.

46. The assembly of claim 44, wherein said first wire is secured to said second portion of said first closing member with an anchor that is received within a recess.

47. The assembly of claim 42, wherein said first end of said first wire is welded to said first closing member and said second end is disposed within said second opening of said second portion of said first closing member.

48. The assembly of claim 42, wherein said first end of said first wire is secured to said first closing member with an anchor that is received within a recess formed in said first closing member and said second end is disposed within said second opening of said second portion of said first closing member.

49. The assembly of claim 28, wherein said first closing member comprises a first tooth element and said second closing member comprises a second tooth element, said first and second toot elements being sized to rest within grooves formed about an outer edge of said first and second lenses.

50. The assembly of claim 28, wherein said bridge comprises a first projection and a second projection, said first and second projections being connected by a central portion.

51. The assembly of claim 50, wherein said central portion is cylindrical and said projections are generally flattened.

52. The assembly of claim 50, wherein said projections each comprises a generally vertically extending guide such that said wire can extend through said guide.

53. The assembly of claim 52, wherein said guide projects toward the respective lens, each lens comprises a circumferential groove and said guide extends at least partially into said groove.

54. The assembly of claim 28, wherein said bridge comprises a first slot through which said first wire can extend and a second slot through which said second wire can extend.

55. The assembly of claim 28, wherein said first wire comprises two separated portions that are joined by said bridge and said second wire comprises two separated portions that are joined by said bridge.

56. The system of claim 28, wherein said first wire is selectively adjustable to secure lenses of various shapes.

57. The system of claim 28, wherein said first wire is selectively adjustable to secure lenses of various sizes and shapes.

58. An eyewear system comprising at least one eyewear lens having an end surface that defines a perimeter of said lens, a multiple filament wire extending around said perimeter, said perimeter having a total length and less than a total of at least about ten percent of said total length of said perimeter being contacted by portions of rigid components.

59. The system of claim 58, wherein said multiple filament construction comprises a plurality of filaments surrounding by an outer casing.

60. The system of claim 58, wherein at least one of said plurality of filaments comprises a material selected from the group consisting of a metal, a metal alloy, a nylon, a polymer, a resin, a natural fiber or a man-made fiber.

61. The system of claim 58, wherein said multiple filament wire is made of a metal or metal alloy.

62. The system of claim 58, wherein said multiple filament wire has a thickness of between about 0.1 mm and about 3.0 mm.

63. The system of claim 62, wherein said multiple filament wire has a thickness of between about 0.4 mm and about 0.6 mm.

64. The system of claim 58, wherein said multiple filament wire has a thickness of between about 0.2 mm and about 1.6 mm.

65. The system of claim 64, wherein said multiple filament wire has a thickness of between about 0.2 mm and about 0.6 mm.

66. The system of claim 65, wherein said multiple filament wire has a thickness of about 0.4 mm.

67. The system of claim 58 further comprising a bridge and a closing member, said bridge being connected to said multiple filament wire and said closing member securing together a first and a second end of said multiple filament wire, said rigid components comprising said bridge and said closing member.

68. The system of claim 67, wherein at least a portion of said closing member comprises a magnet or a material that is attracted by a magnet.

69. The system of claim 58, wherein said wire is selectively adjustable to secure lenses of various shapes.

70. The system of claim 58, wherein said wire is selectively adjustable to secure lenses of various sizes and shapes.

71. An eyewear system comprising a least one eyewear lens having an end surface that defines a perimeter of said lens, a multiple filament wire extending around said perimeter, said perimeter having a total length and less than a total of at least about 5% (five percent) of said total length of said perimeter being contacted by portions of rigid components.

72. The system of claim 71, wherein said multiple filament construction comprises a plurality of filaments surrounding by an outer casing.

73. The system of claim 72, wherein at least one of said plurality of filaments comprises a material selected from the group consisting of a metal, a metal ahoy, a nylon, a polymer, a resin, a natural fiber or a man-made fiber.

74. The system of claim 71, wherein said multiple filament wire is made of a metal or metal alloy.

75. The system of claim 71, wherein said multiple filament wire has a thickness of between about 0.1 mm and about 3.0 mm.

76. The system of claim 75, wherein said multiple filament wire has a thickness of between about 0.2 mm and about 0.6 mm.

77. The system of claim 71, wherein said multiple filament wire has a thickness of between about 0.2 mm and about 1.6 mm.

78. The system of claim 77, wherein said multiple filament wire has a thickness of between about 0.4 mm and about 6 mm.

79. The system of claim 78, wherein said multiple filament wire has a thickness of about 0.4 mm.

80. The system of claim 71, wherein said multiple filament wire comprises a plurality of filaments retained in a casing.

81. The system of claim 71 further comprising a bridge and a closing member, said bridge being connected to said multiple filament wire and said closing member securing together a first and a second end of said multiple filament wire, said rigid components comprising said bridge and said closing member.

82. The system of claim 81, wherein at least a portion of one of said closing members includes a magnet or a material that is attracted by a magnet.

83. The system of claim 71, wherein said wire is selectively adjustable to secure lenses of various shapes.

84. The system of claim 71, wherein said wire is selectively adjustable to secure lenses of various sizes and shapes.

* * * * *

UNITED STATES PATENT AND TRADEMARK OFFICE
CERTIFICATE OF CORRECTION

PATENT NO.       : 7,140,727 B2
APPLICATION NO.  : 10/846357
DATED            : November 28, 2006
INVENTOR(S)      : James F. Pilat et al.

It is certified that error appears in the above-identified patent and that said Letters Patent is hereby corrected as shown below:

On Title Page Item 56

On page 1, at column 2, line 13, please delete "te al." and insert --et al.--, therefor.

On page 1, at column 2, line 1, please delete "Supportign" and insert --Supporting--, therefor.

On page 1, at column 2, line 1, after "A", please insert --of--.

On page 3, at column 2, line 5, please delete "Sunglases," and insert --Sunglasses,--, therefor.

On page 3, at column 2, line 7, please delete "Issues" and insert --Issued--, therefor.

Column 22, line 46, in Claim 22, please delete "looking" and insert --locking--, therefor.

Column 24, line 10, in Claim 41, please delete "portion" and insert --portions--, therefor.

Column 24, line 37, in Claim 49, please delete "toot" and insert --tooth--, therefor.

Column 25 line 39, in Claim 71, please delete "a" and insert --at--, therefor.

Column 26, line 6 (Approximate), in Claim 73, please delete "ahoy," and insert --alloy,--, therefor.

UNITED STATES PATENT AND TRADEMARK OFFICE
CERTIFICATE OF CORRECTION

PATENT NO. : 7,140,727 B2
APPLICATION NO. : 10/846357
DATED : November 28, 2006
INVENTOR(S) : James F. Pilat et al.

It is certified that error appears in the above-identified patent and that said Letters Patent is hereby corrected as shown below:

Column 26, line 22 (Approximate), in Claim 78, please delete "6" and insert --0.6--, therefor.

Signed and Sealed this

Seventh Day of August, 2007

JON W. DUDAS
*Director of the United States Patent and Trademark Office*